US008875058B2

(12) United States Patent
Takahashi

(10) Patent No.: US 8,875,058 B2
(45) Date of Patent: Oct. 28, 2014

(54) INPUT APPARATUS AND INPUT SYSTEM

(75) Inventor: Kazuhiro Takahashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 945 days.

(21) Appl. No.: 12/687,513

(22) Filed: Jan. 14, 2010

(65) Prior Publication Data
US 2010/0229128 A1 Sep. 9, 2010

(30) Foreign Application Priority Data

Mar. 3, 2009 (JP) ................................. 2009-048689

(51) Int. Cl.
| | | |
|---|---|---|
| G06F 3/048 | (2013.01) | |
| H04N 21/422 | (2011.01) | |
| G06F 3/0346 | (2013.01) | |
| G06F 3/0481 | (2013.01) | |
| H04N 5/445 | (2011.01) | |
| G06F 3/01 | (2006.01) | |
| G06F 3/0484 | (2013.01) | |
| G06F 3/038 | (2013.01) | |
| H04N 21/431 | (2011.01) | |
| H04N 5/44 | (2011.01) | |
| G06F 3/0482 | (2013.01) | |

(52) U.S. Cl.
CPC ...... *G06F 3/04812* (2013.01); *H04N 21/42222* (2013.01); *H04N 21/42204* (2013.01); *G06F 3/038* (2013.01); *G06F 3/0346* (2013.01); *G06F 3/0481* (2013.01); *H04N 21/4316* (2013.01); *H04N 21/42221* (2013.01); *H04N 2005/4428* (2013.01); *H04N 5/44591* (2013.01); *G06F 3/0482* (2013.01); *H04N 21/4221* (2013.01); *G06F 3/017* (2013.01); *G06F 3/04842* (2013.01)

USPC ........... 715/858; 715/856; 715/857; 715/862; 715/863; 345/156; 345/157

(58) Field of Classification Search
CPC ... G06F 3/038; G06F 3/0481; G06F 3/04812; G06F 3/04842; G06F 3/0482
USPC .......... 715/856, 862, 858, 863, 857; 345/156, 345/157
See application file for complete search history.

(56) References Cited

U.S. PATENT DOCUMENTS

| | | | | | |
|---|---|---|---|---|---|
| 5,874,941 | A | * | 2/1999 | Yamada | 345/157 |
| 5,963,191 | A | * | 10/1999 | Jaaskelainen, Jr. | 715/856 |
| 6,005,550 | A | * | 12/1999 | Vaughan et al. | 345/157 |
| 6,049,325 | A | * | 4/2000 | Alexander | 345/157 |
| 6,184,883 | B1 | * | 2/2001 | Bates et al. | 715/794 |

(Continued)

FOREIGN PATENT DOCUMENTS

| | | | |
|---|---|---|---|
| JP | 01200431 | A * | 8/1989 |
| JP | 5-61608 | A | 3/1993 |
| JP | 6-160935 | A | 6/1993 |
| JP | 8-339287 | A | 12/1996 |

*Primary Examiner* — Patrick Riegler
(74) *Attorney, Agent, or Firm* — Crowell & Moring LLP

(57) ABSTRACT

An input apparatus includes an operating portion, a display screen portion capable of displaying a first screen having a first selection region selected when a state where the pointer is overlapped is held for a first time and a second screen having a second selection region selected when a state where the pointer is overlapped is held for a second time, and a control portion performing control of moving a display position of the pointer in a first direction so that the pointer does not overlap the second selection region, when the first selection region is selected to be switched to the second screen.

17 Claims, 13 Drawing Sheets

(56) References Cited

U.S. PATENT DOCUMENTS

| | | |
|---|---|---|
| 6,219,028 B1 * | 4/2001 | Simonson ..................... 715/862 |
| 6,489,981 B1 * | 12/2002 | Jones ............................ 715/862 |
| 6,559,873 B1 * | 5/2003 | Dawkins et al. .............. 715/862 |
| 6,628,315 B1 * | 9/2003 | Smith Dawkins et al. .... 715/856 |
| 6,874,126 B1 * | 3/2005 | Lapidous ...................... 715/711 |
| 6,885,363 B2 * | 4/2005 | Smith ........................... 345/157 |
| 7,362,306 B2 * | 4/2008 | Shibazaki et al. ............ 345/157 |
| 7,565,622 B2 * | 7/2009 | Chen et al. .................... 715/810 |
| 2002/0063740 A1 * | 5/2002 | Forlenza et al. .............. 345/856 |
| 2003/0197744 A1 * | 10/2003 | Irvine ........................... 345/856 |
| 2005/0160380 A1 * | 7/2005 | Konar et al. .................. 715/858 |
| 2009/0007023 A1 * | 1/2009 | Sundstrom .................... 715/858 |
| 2009/0249257 A1 * | 10/2009 | Bove et al. .................... 715/858 |
| 2010/0309122 A1 * | 12/2010 | Abe et al. ..................... 345/157 |

* cited by examiner

FIG.8 CONTROL FLOW IN ROLLOVER OPERATION OF LIQUID CRYSTAL TELEVISION

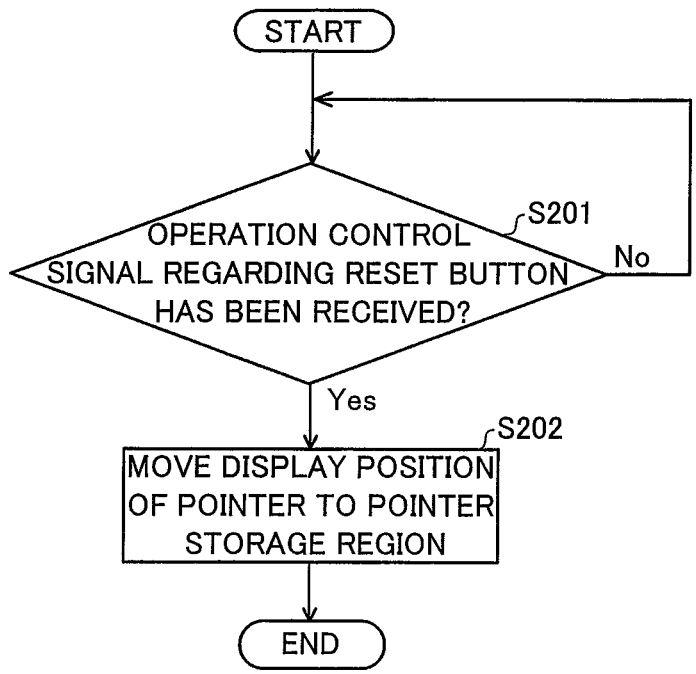

INPUT APPARATUS AND INPUT SYSTEM

BACKGROUND OF THE INVENTION

1. Field of the Invention

This invention relates to an input apparatus and an input system, and more particularly, it relates to an input apparatus and an input system each moving a display position of a pointer by a control portion.

2. Description of the Background Art

An input apparatus and an input system each moving a display position of a pointer by a control portion is known in general, as disclosed in Japanese Patent Laying-Open Nos. 5-150935, 8-339287 and 5-61608, for example.

The aforementioned Japanese Patent Laying-Open No. 5-150935 discloses a pointing cursor control apparatus comprising a character input device for inputting characters in a character cursor display position specifying a character input position, a pointing device (operating portion) for movably operating a pointing cursor (pointer) having an arrow shape, a display displaying the character cursor, the pointing cursor and a character which was input, and a control portion so controlling movement of a position of the pointing cursor that the pointing cursor does not enter a certain range of the character cursor display position when the character cursor display position on which the character cursor is displayed and the pointing cursor are in the certain range. The aforementioned Japanese Patent Laying-Open No. 5-150935 neither discloses nor suggests an operation (rollover operation) of selecting a selection region when a state where the pointer overlaps the selection region is held for a prescribed time.

The aforementioned Japanese Patent Laying-Open No. 8-339287 discloses a data input apparatus comprising a keyboard for inputting characters in a character cursor position specifying a character input position, a mouse (operating portion) for movably operating a mouse cursor (pointer) having an arrow shape, a CRT (display screen portion) displaying the character cursor, the mouse cursor, a mouse cursor storage area storing the mouse cursor and a character which was input, and a control portion performing control of moving the mouse cursor to the mouse cursor storage area when character cursor position information and mouse cursor position information coincide with each other. In the aforementioned Japanese Patent Laying-Open No. 8-339287, in a case where no mouse cursor storage area is provided, a shape of the mouse cursor is changed from the arrow shape to an under bar shape displayed below a character located on the mouse cursor when the character cursor position information and the mouse cursor position information coincide with each other. The aforementioned Japanese Patent Laying-Open Nos. 8-339287 neither discloses nor suggests an operation (rollover operation) of selecting a selection region when a state where the pointer overlaps the selection region is held for a prescribed time.

The aforementioned Japanese Patent Laying-Open No. 5-61608 discloses a cursor control apparatus comprising a keyboard for inputting characters, a mouse (operating portion) for movably operating a locator cursor (pointer) having an arrow shape, a display (display screen portion) displaying the locator cursor and a character which was input, and a CPU (control portion) performing control of automatically moving a position of the locator cursor to a position where a character which is newly input and the locator cursor overlap do not overlap when both of them overlap with each other. The aforementioned Japanese Patent Laying-Open No. 5-61608 neither discloses nor suggests an operation (rollover operation) of selecting a selection region when a state where the pointer overlaps the selection region is held for a prescribed time.

However, each of the aforementioned Japanese Patent Laying-Open Nos. 5-150935, 8-339287 and 5-61608 neither discloses nor suggest the rollover operation. In a case where each of the aforementioned Japanese Patent Laying-Open Nos. 5-150935, 8-339287 and 5-61608 is formed to allow the rollover operation, when the selection region is selected and a new screen is displayed in holding the state where the pointing cursor (the mouse cursor, the locator cursor) overlaps the selection region for the prescribed time, a new selection region displayed on the new screen is conceivably disadvantageously selected contrary to intension of a user resulting from display in a state where the pointing cursor (the mouse cursor, the locator cursor) overlaps the new selection region.

SUMMARY OF THE INVENTION

The present invention has been proposed in order to solve the aforementioned problems, and an object of the present invention is to provide an input apparatus capable of preventing a new selection region from selection contrary to intension of a user in a case of performing an operation (rollover operation) of selecting a selection region when a state where a pointer overlaps the selection region is held for a prescribed time.

An input apparatus according to a first aspect of the present invention comprises an operating portion for movably operating a pointer, a display screen portion capable of displaying the pointer, a first screen having a first selection region selected when a state where the pointer is overlapped is held for a first time, and a second screen switched from the first screen when the first selection region is selected and having a second selection region selected when a state where the pointer is overlapped is held for a second time, and a control portion performing control of moving a display position of the pointer in a first direction so that the pointer does not overlap the second selection region of the second screen, when the first selection region of the first screen is selected to be switched to the second screen by holding the state where the pointer is overlapped for the first time.

As hereinabove described, this input apparatus according to the first aspect of the present invention comprises the control portion performing control of moving the display position of the pointer in the first direction so that the pointer does not overlap the second selection region of the second screen, when the first selection region of the first screen is selected to be switched to the second screen by holding the state where the pointer is overlapped for the first time, whereby the display position of the pointer can be moved so as not to overlap the second selection region of the second screen, and hence the second selection region can be prevented from being selected in the state of performing an operation (rollover operation) of selecting the first selection region when the pointer overlaps the first selection region is held for the first time contrary to intension of the user.

In the input apparatus according to the aforementioned first aspect, the display screen portion is preferably formed to be capable of displaying a third screen switched from the second screen when the second selection region is selected and having a third selection region selected when a state where the pointer is overlapped is held for a third time, and the control portion preferably performs control of moving the display position of the pointer in a second direction opposite to the first direction and moving the display position of the pointer so as not to overlap the third selection region of the third screen when the second selection region is selected to be switched to the third screen by moving the pointer, the display position of which is moved in the first direction by the control portion, by a user and overlapping the pointer with the second selection region of the second screen. According to this structure, the control portion can move the display position of the pointer moved in the first direction when the first selection region is selected to be switched to the second screen in the second direction opposite to the first direction when the second selection region is selected to be switched to the third screen. Thus, the display position of the pointer after moving in the second direction can be inhibited from moving away from the display position of the pointer before moving in the first direction while avoiding overlap of the display position of the pointer with the third selection region.

In this case, the control portion preferably performs control of moving the display position of the pointer in the second direction opposite to the first direction and moving the display position of the pointer so as not to overlap the third selection region of the third screen in a case where the display position of the pointer overlaps the third selection region when the second selection region is selected to be switched to the third screen, and control of not moving the display position of the pointer in a case where the display position of the pointer does not overlap the third selection region. According to this structure, the display position of the pointer after moving in the second direction can be inhibited from moving away from the display position of the pointer before moving in the first direction while avoiding overlap of the display position of the pointer with the third selection region when the display position of the pointer overlaps the third selection region. Further, no movement of the display position of the pointer can inhibit the display position of the pointer from changing every time the screen is switched when the pointer does not overlap the third selection region. Thus, the user may not correspond to change of the display position every time the display position of the pointer changes, and hence deterioration of operability can be suppressed.

In the aforementioned input apparatus according to the first aspect, the control portion preferably performs control of moving the display position of the pointer in the first direction by obtaining distances between the display position of the pointer before movement and outer edges, located in a plurality of directions, of the second selection region and employing the direction where the distance is the smallest among obtained the plurality of distances as the first direction, in a case where the pointer overlaps the second selection region of the second screen when the first selection region of the first screen is selected to be switched to the second screen. According to this structure, the display position of the pointer can be moved to the outside of the second selection region in the closest direction among the outer edges, located in the plurality of directions, of the second selection region so as not to overlap the second selection region, and hence the quantity of movement of the display position of the pointer can be reduced. Thus, the user can be unlikely to lose the display position of the pointer.

The aforementioned input apparatus in which the display position of the pointer is so moved in the second direction that the display position of the pointer does not overlap the third selection region preferably further comprises a storage portion for storing a first position coordinate of the display position of the pointer before movement in the first direction by the control portion and a second position coordinate of the display position of the pointer after movement in the first direction by the control portion, wherein the control portion performs control of moving the display position of the pointer in the second direction opposite to the first direction by obtaining the first direction from the first and second position coordinates stored in the storage portion when the second selection region is selected to be switched to the third screen. According to this structure, the display position of the pointer moved in the first direction when the first selection region is selected to be switched to the second screen can be easily moved in the second direction opposite to the first direction to be displayed when the second selection region is selected to be switched to the third screen by obtaining the first direction from the first and second position coordinates stored in the storage portion by the control portion.

In the aforementioned input apparatus in which the first direction is obtained from the first and second position coordinates, the control portion preferably performs control of moving the display position of the pointer in the second direction opposite to the first direction by employing a direction where the second position coordinate is located with reference to the first position coordinate as the first direction when the second selection region is selected to be switched to the third screen. According to this structure, the display position of the pointer can be more easily moved in the second direction opposite to the first direction to be displayed when the second selection region is selected to be switched to the third screen.

In the aforementioned input apparatus in which the display position of the pointer is so moved in the second direction that the pointer does not overlap the third selection region, the control portion is preferably formed to move the display position of the pointer to the vicinity of an outer edge of the second selection region on a side in the first direction and move the display position of the pointer to the vicinity of an outer edge of the third selection region on a side in the second direction. According to this structure, the distance of the movement of the display position of the pointer can be reduced as compared with a case where the display position of the pointer is moved to the position separated from the outer edge of the selection region by the control portion, and hence the user can be inhibited from losing the display position of the pointer.

In the aforementioned input apparatus in which the display position of the pointer is so moved in the second direction that the display position of the pointer does not overlap the third selection region, the display screen portion is preferably formed to be capable of displaying a pointer storage region arranged on a position not to be overlapped with the first, second and third selection regions, the operating portion is preferably formed to allow a reset operation for moving the display position of the pointer to the pointer storage region, and the control portion is preferably formed to move the display position of the pointer to the pointer storage region on the basis of the reset operation. According to this structure, the user can move the display position of the pointer to the pointer storage region by operating the reset operation on the operating portion, and hence the user can resume an operation from the display position of the pointer moved to the pointer storage region also when the display position of the pointer was lost during the operation. Further, the pointer storage region is arranged on the position not to be overlapped with the first, second and third selection regions, whereby selection of the first, second and third selection regions can be prevented when the pointer is located on the pointer storage region.

In the aforementioned input apparatus allowing the reset operation, the pointer storage region is preferably arranged in the vicinity of a corner of the display screen portion. According to this structure, the pointer storage region can inhibit the position allowing display of the selection region in the display screen portion from restriction as compared with a case where the pointer storage region is arranged on a position other than the position in the vicinity of the corner of the display screen portion, and hence the degree of freedom in layout of the selection region in the display screen portion can be improved.

In the aforementioned input apparatus allowing the reset operation, the operating portion preferably includes a reset button pressed by the user in the reset operation. According to this structure, the user can perform the reset operation only by pressing the reset button without further operating the selection region and the like displayed on the display screen portion, and hence the pointer can be easily displayed in the pointer storage region when the user lost the pointer.

In the aforementioned input apparatus allowing the reset operation, the control portion preferably stops control of moving the display position of the pointer so that the pointer does not overlap the first, second or third selection region and performs control of moving the display position of the pointer to the pointer storage region when the reset operation is performed. According to this structure, the user can further promptly resume an input operation from the display position of the pointer moved to the pointer storage region also when the user lost the pointer.

In the aforementioned input apparatus according to the first aspect, the control portion preferably performs control of moving the display position of the pointer in the first direction different from a direction where a plurality of the second selection regions are adjacent to each other in a case where the plurality of second selection regions are displayed on the switched second screen to be adjacent to each other when the first selection region is selected and the first screen is switched by holding the state where the pointer is overlapped for the first time. According to this structure, the display position of the pointer can be inhibited from overlapping the adjacent selection regions on a destination due to the plurality of selection regions which are adjacent in a case where an interval between the selection regions are small.

In this case, the control portion preferably performs control of moving the display position of the pointer in either one of upper and lower directions in a case where the plurality of second selection regions are displayed on the switched second screen to be adjacent horizontally. According to this structure, the display position of the pointer can be inhibited from overlapping the adjacent selection regions on a destination due to the plurality of selection regions which are horizontally adjacent in a case where a horizontal interval between the selection regions are small.

In the aforementioned input apparatus according to the first aspect, the operating portion preferably includes a detection portion detecting vertical/horizontal movement of the operating portion by a user, and the control portion preferably performs control of displaying the pointer on the display screen portion to be vertically/horizontally movable in response to the vertical/horizontal movement of the operating portion detected by the detection portion. According to this structure, the user can operate the display position of the pointer in association of the vertical/horizontal movement of the operating portion, and hence an input operation for moving and overlapping the display position of the pointer with the selection region can be more easily operated by the operating portion.

An input system according to a second aspect of the present invention comprises an operating member for performing an input operation by radio communication, and a display including a display screen portion movably displaying a pointer on the basis of the input operation by the operating member and a control portion, wherein the display screen portion of the display is so formed to be capable of displaying a first screen having a first selection region selected when a state where the pointer is overlapped is held for a first time, and a second screen switched from the first screen when the first selection region is selected and having a second selection region selected when a state where the pointer is overlapped is held for a second time, and the control portion of the display performs control of moving a display position of the pointer in a first direction so that the pointer does not overlap the second selection region of the second screen, when the first selection region of the first screen is selected to be switched to the second screen by holding the state where the pointer is overlapped for the first time.

In this input system according to the second aspect of the present invention, as hereinabove described, the control portion performing control of moving the display position of the pointer in the first direction so that the pointer does not overlap the second selection region of the second screen when the first selection region of the first screen is selected to be switched to the second screen by holding the state where the pointer is overlapped for the first time is provided on the display, whereby the display position of the pointer can be moved so as not to overlap the second selection region of the second screen, and hence the second selection region can be prevented from being selected contrary to intension of the user in the case of performing an operation (rollover operation) of selecting the first selection region when the state where the pointer overlaps the first selection region is held for the first time. Further, the operating member and the display including the display screen portion and the control portion are separately provided, and an input operation is transmitted from the operating member to the display by radio communication, whereby the size of the operating member can be reduced and no cable for transmitting a signal is required, and hence the user can easily operate the operating member for the input operation.

In the aforementioned input system according to the second aspect, the display screen portion of the display is preferably formed to be capable of displaying a third screen switched from the second screen when the second selection region is selected and having a third selection region selected when a state where the pointer is overlapped is held for a third time, and the control portion of the display preferably performs control of moving the display position of the pointer in a second direction opposite to the first direction and moving the display position of the pointer so as not to overlap the third selection region of the third screen when the second selection region is selected to be switched to the third screen by moving the pointer, the display position of which is moved in the first direction by the control portion, by a user and overlapping the pointer with the second selection region of the second screen. According to this structure, the control portion of the display can move the display position of the pointer moved in the first direction when the first selection region is selected to be switched to the second screen in the second direction opposite to the first direction when the second selection region is selected to be switched to the third screen. Thus, the display position of the pointer after moving in the second direction can be inhibited from moving away from the display position of the pointer before moving in the first direction while avoiding overlap of the display position of the pointer with the third selection region.

In this case, the control portion of the display preferably performs control of moving the display position of the pointer in the second direction opposite to the first direction and moving the display position of the pointer so as not to overlap the third selection region of the third screen in a case where the display position of the pointer overlaps the third selection region when the second selection region is selected to be switched to the third screen, and control of not moving the display position of the pointer in a case where the display position of the pointer does not overlap the third selection region. According to this structure, the display position of the pointer after moving in the second direction can be inhibited from moving away from the display position of the pointer before moving in the first direction while avoiding overlap of the display position of the pointer with the third selection region when the display position of the pointer overlaps the third selection region. Further, no movement of the display position of the pointer can inhibit the display position of the pointer from changing every time the screen is switched when the pointer does not overlap the third selection region. Thus, the user may not correspond to change of the display position every time the display position of the pointer changes, and hence deterioration of operability can be suppressed.

In the aforementioned input system in which the display position of the pointer is so moved in the second direction that the display position of the pointer does not overlap the third selection region, the display screen portion of the display is preferably formed to be capable of displaying a pointer storage region arranged on a position not to be overlapped with the first, second and third selection regions, the operating member is preferably formed to allow a reset operation for moving the display position of the pointer to the pointer storage region, and the control portion of the display is preferably formed to move the display position of the pointer to the pointer storage region on the basis of the reset operation. According to this structure, the user can move the display position of the pointer to the pointer storage region by operating the reset button on the operating member, and hence the user can resume an operation from the display position of the pointer moved to the pointer storage region also when the display position of the pointer was lost during the operation. Further, the pointer storage region is arranged on the position not to be overlapped with the first, second and third selection regions, whereby selection of the first, second and third selection regions can be prevented when the pointer is located on the pointer storage region.

In the aforementioned input system allowing the reset operation, the operating member preferably includes a reset button pressed by the user in the reset operation. According to this structure, the user can perform the reset operation only by pressing the reset button without further operating the selection region and the like displayed on the display screen portion, and hence the user can more easily resume an operation from the display position of the pointer moved to the pointer storage region also when the user lost the pointer.

In the aforementioned input system according to the second aspect, the operating member preferably includes a detection portion detecting vertical/horizontal movement of the operating member by a user, and transmits a detection signal regarding detection of the detection portion, and the control portion of the display preferably performs control of displaying the pointer on the display screen portion to be vertically/horizontally movable in response to the vertical/horizontal movement of the operating member based on the received detection signal. According to this structure, the user can operate the display position of the pointer in association of the vertical/horizontal movement of the operating member, and hence an input operation for moving and overlapping the display position of the pointer with the selection region can be more easily operated by the operating member. The detection signal which is a radio signal is transmitted from the operating member to the display, whereby the operating member can be easily three-dimensionally moved dissimilarly to a case where cables are connected to each other. Thus, the user can freely operate the remote controller 1.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a diagram showing a control flow in pressing a reset button of a liquid crystal television of the input apparatus shown in FIG. 11.

DESCRIPTION OF THE PREFERRED EMBODIMENTS

Embodiments of the present invention will be hereinafter described with reference to the drawings.

First Embodiment

An input apparatus 100 according to a first embodiment of the present invention will be now described with reference to FIGS. 1 to 6. The input apparatus 100 is an example of the "input system" in the present invention.

Figure 1:
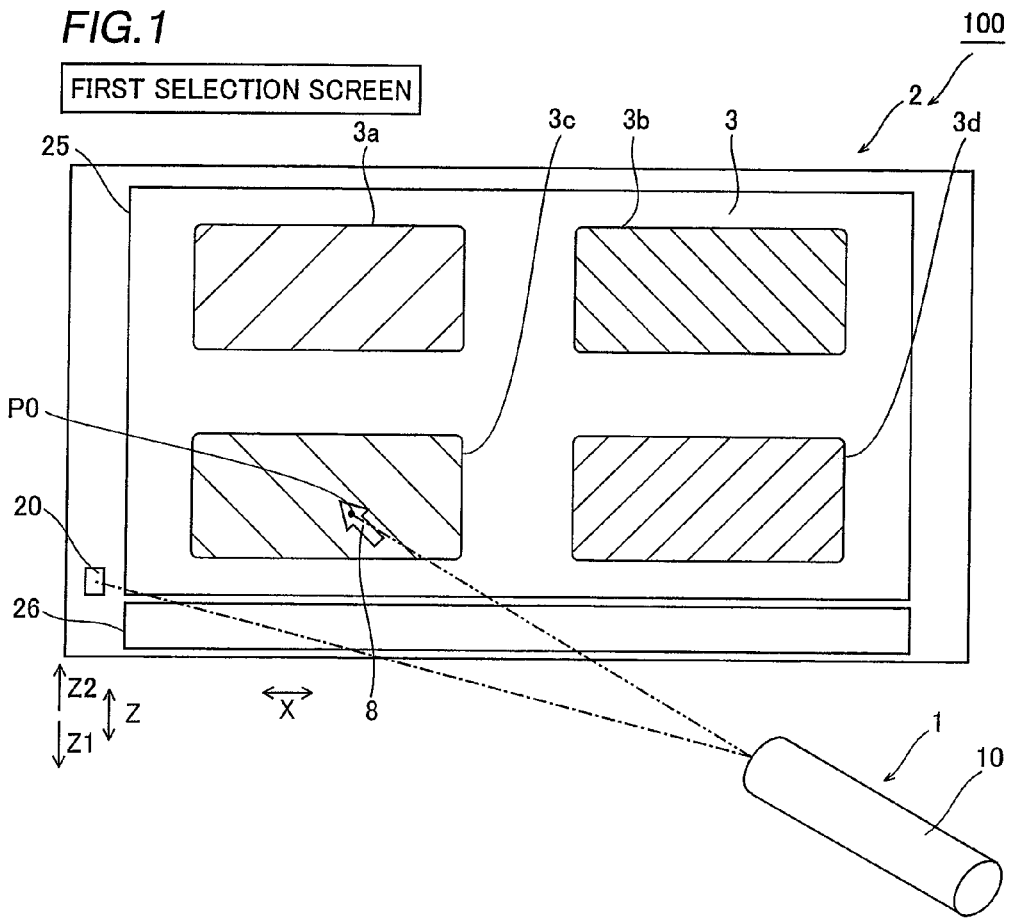
FIG. 1 is a diagram showing an overall structure of an input apparatus according to a first embodiment of the present invention.

The input apparatus 100 according to the first embodiment of the present invention comprises a remote controller 1 and a liquid crystal television 2, as shown in FIG. 1. The remote controller 1 is constituted by a columnar housing 10, and is provided with no operating button for operating a pointer 8, described later, on a surface of the housing 10. The remote controller 1 is an example of the "operating portion" or the "operating member" in the present invention, and the liquid crystal television 2 is an example of the "display" in the present invention.

Figure 2:
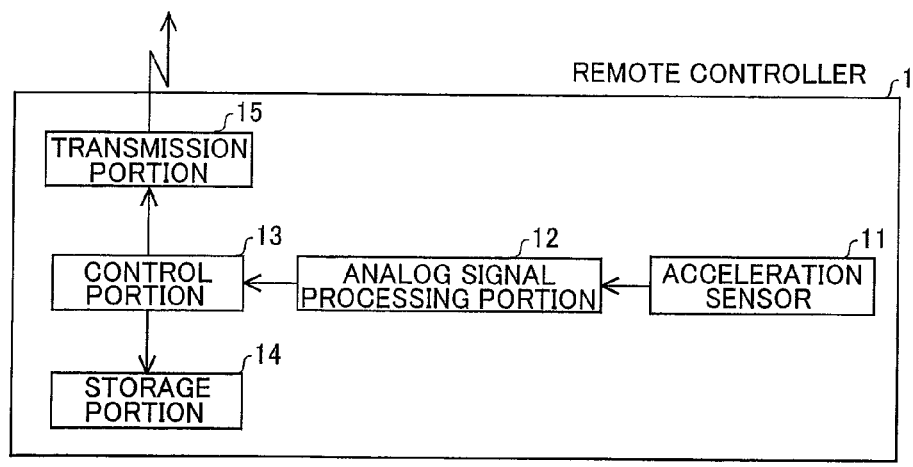
FIG. 2 is a block diagram showing a structure of a remote controller of the input apparatus shown in FIG. 1.

The remote controller 1 includes an acceleration sensor 11, an analog signal processing portion 12, a control portion 13, a storage portion 14 and a transmission portion 15, as shown in FIG. 2. The acceleration sensor 11 has a function of detecting vertical/horizontal movement of the remote controller 1. The acceleration sensor 11 is formed to output the vertical/horizontal movement of the remote controller 1 to the analog signal processing portion 12 as an analog signal. The analog signal processing portion 12 is formed to convert the analog signal output from the acceleration sensor 11 to a digital signal and output it to the control portion 13. The acceleration sensor 11 is an example of the "detection portion" in the present invention.

The control portion 13 has a function of temporarily storing the digital signal regarding the vertical/horizontal movement of the remote controller 1 output from the analog signal processing portion 12 in the storage portion 14. The control portion 13 has a function of transmitting the digital signal regarding the vertical/horizontal movement of the remote controller 1 from the transmission portion 15 to the outside as an operation control signal (detection signal), employing a radio signal (RF (radio frequency) signal).

Figure 3:
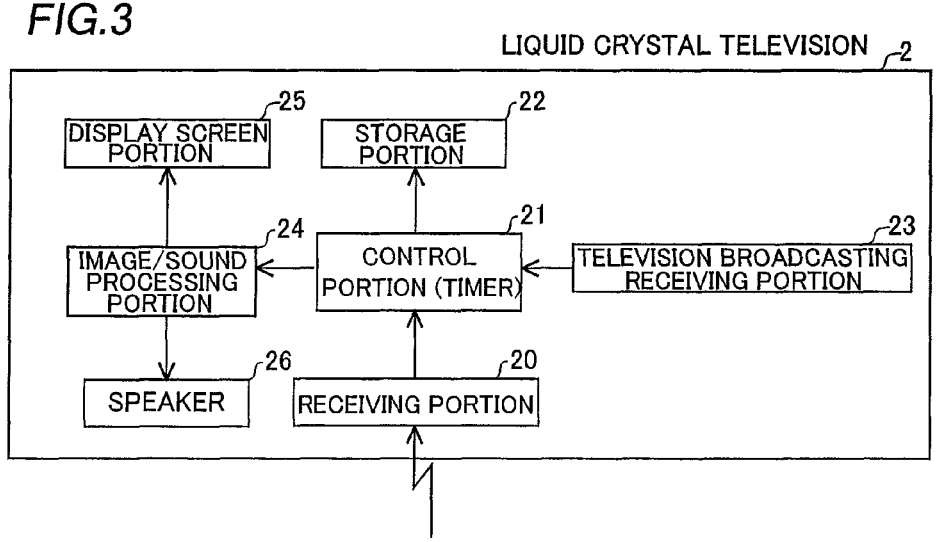
FIG. 3 is a block diagram showing a structure of a liquid crystal television of the input apparatus shown in FIG. 1.

The liquid crystal television 2 is provided with a receiving portion 20 receiving the operation control signal (alternate long and short dash lines in FIG. 1) regarding the vertical/horizontal movement of the remote controller 1 transmitted from the transmission portion 15 (see FIG. 2), a control portion 21 performing processing for the operation control signal (detection signal), and a storage portion 22 storing contents of the processing for the operation control signal, as shown in FIG. 3. The control portion 21 stores a timer, and the control portion 21 is formed to measure time elapsed from reception of the operation control signal on the receiving portion 20. The specific control of the control portion 21 will be described later. The liquid crystal television 2 is further provided with a television broadcasting receiving portion 23 for receiving a television broadcasting.

The liquid crystal television 2 includes an image/sound processing portion 24, a display screen portion 25, and a speaker 26 producing sounds. The image/sound processing portion 24 performs processing to display an image on the display screen portion 25 in response to processing of the control portion 21. More specifically, the image/sound processing portion 24 performs processing for displaying a first selection screen 3 (see FIG. 1), a second selection screen 4 (see FIGS. 4 and 5) and a third selection screen 5 (see FIG. 6), and processing for movably displaying the pointer 8 in each of the first, second and third selection screens 3, 4 and 5 in association with the vertical/horizontal movement of the remote controller 1 on the basis of the processing on the control portion 21. The image/sound processing portion 24 is formed to perform processing for producing sounds from the speaker 26 on the basis of the processing on the control portion 21. As shown in FIG. 1, the display screen portion 25 is formed on a substantially overall front surface of the liquid crystal television 2, and the speaker 26 is arranged on a lower portion (along arrow Z1) of the display screen portion 25.

An outline of a rollover operation of the input apparatus 100 according to the first embodiment of the present invention will be now described with reference to FIG. 1 and FIGS. 3 to 7.

As shown in FIG. 1, the first selection screen 3 is displayed on the display screen portion 25. Four first selection regions 3a to 3d having the same rectangular shape and the pointer 8 are displayed on this first selection screen 3. These four first selection regions 3a to 3d are formed to be automatically selected when a state where the pointer 8 is overlapped (rollover operation) is held for one second, and the second selection screen 4 (see FIG. 4) is displayed on the display screen portion 25 by selecting any of the first selection regions 3a to 3d.

The pointer 8 is displayed to move on the display screen portion 25 in association with the vertical/horizontal movement of the remote controller 1 by a user. At this time, the display position where the pointer 8 is displayed is denoted as a reference position P0. This reference position P0 is set to move in association with the vertical/horizontal movement of the pointer 8. In the first embodiment, a case where the first selection region 3c is selected by holding the state where the pointer 8 overlaps the first selection region 3c for one second by the user shown in FIG. 1 will be described. The reference position P0 is an example of the "first position coordinate" in the present invention.

Figure 4:
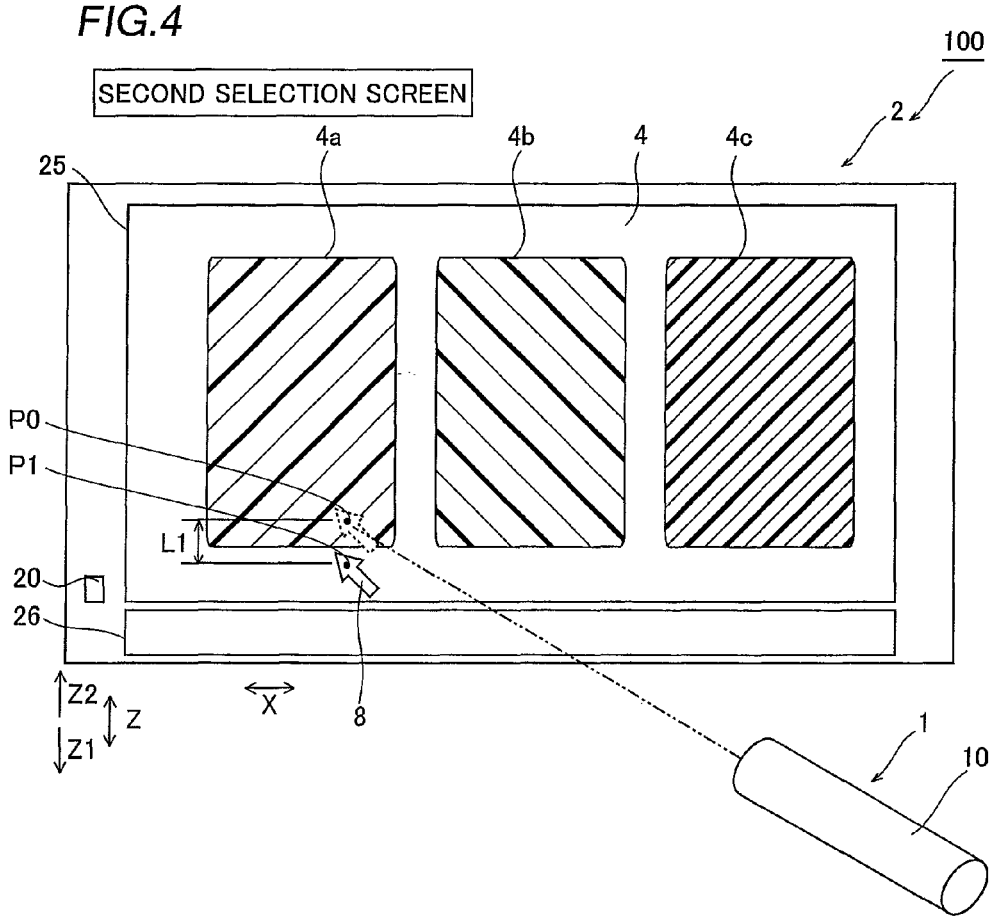
FIGS. 4 to 7 are diagrams for illustrating a display position of a pointer in a rollover operation of the input apparatus shown in FIG. 1.

As shown in FIG. 4, the second selection screen 4 is displayed on the display screen portion 25 and three second selection regions 4a to 4c having the same rectangular shape and the pointer 8 are displayed on the second selection screen 4 by selecting the first selection region 3c. These three second selection regions 4a to 4c are displayed in a state of being horizontally adjacent to each other (in a direction X), and automatically selected when a state where the pointer 8 is overlapped is held for one second.

According to the first embodiment, in a case where the display position (reference position P0 (broken line)) of the pointer 8 overlaps the second selection region 4a of the second selection screen 4 when switching from the first selection screen 3 (see FIG. 1) to the second selection screen 4, a distance between a Z-coordinate of the reference position P0 of the pointer 8 and a Z-coordinate of an outer edge of the second selection region 4a on a side along arrow Z2 and a distance between the Z-coordinate of the reference position P0 of the pointer 8 and a Z-coordinate of an outer edge of the second selection region 4a on a side along arrow Z1 are obtained by the control portion 21 (see FIG. 3). Then, the control portion 21 determines that the distance between the reference position P0 of the pointer 8 and the outer edge of the second selection region 4a on the side along arrow Z1 is smaller than the distance between the reference position P0 of the pointer 8 and the outer edge of the second selection region 4a on the side along arrow Z2 and performs processing for moving the display position of the pointer 8 in the direction Z1 from the reference position P0 and moving the same outside in the vicinity of the outer edge of the second selection region 4a on the side along arrow Z1 (first position correction processing), and the pointer 8 is displayed on the second selection screen 4. The second selection regions 4a to 4c are displayed in the state of being horizontally adjacent to each other (in the direction X), and hence the display position of the pointer 8 is moved not horizontally (in the direction X) but vertically (in the direction Z). At this time, the display position where the pointer 8 is displayed is denoted as a first correction position P1. This first correction position P1 is set to move in association with the vertical/horizontal movement of the pointer 8. The reference position P0 and the first correction position P1 are in a separated state in the direction Z by a distance L1. The direction Z1 is an example of the "first direction" in the present invention, and the first correction position P1 is an example of the "second position coordinate" in the present invention.

Figure 5:
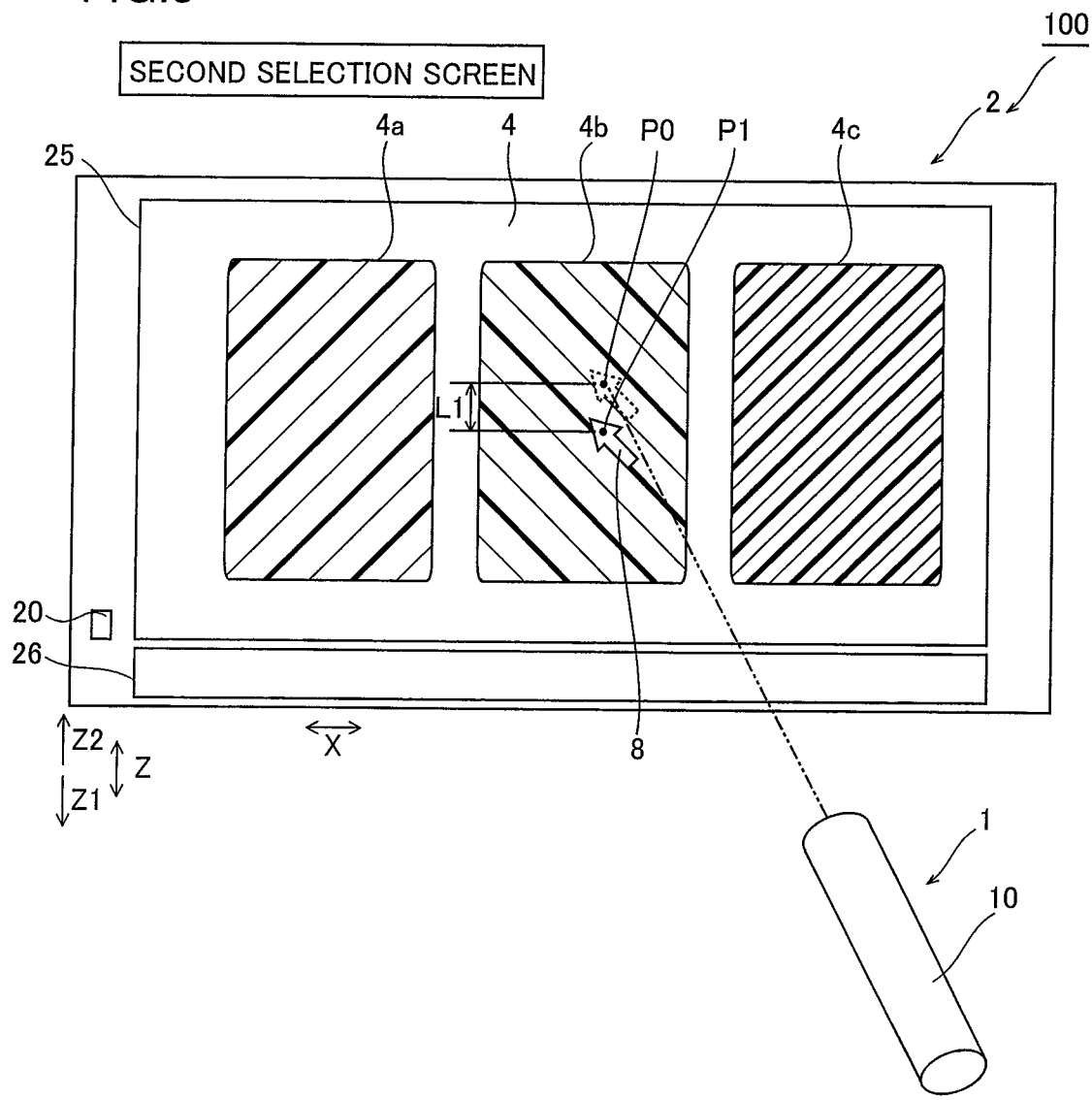

A case where the second selection region 4b is automatically selected by holding a state where the pointer 8 overlaps the second selection region 4b for one second, after moving the pointer 8 subjected to the first position correction processing into the second selection region 4b of the second selection screen 4 by the user as shown in FIG. 5 will be described. When moving the pointer 8 subjected to the first position correction processing, the relative positional relation between the reference position P0 of the pointer 8 and the first correction position P1 is not changed.

Figure 6:
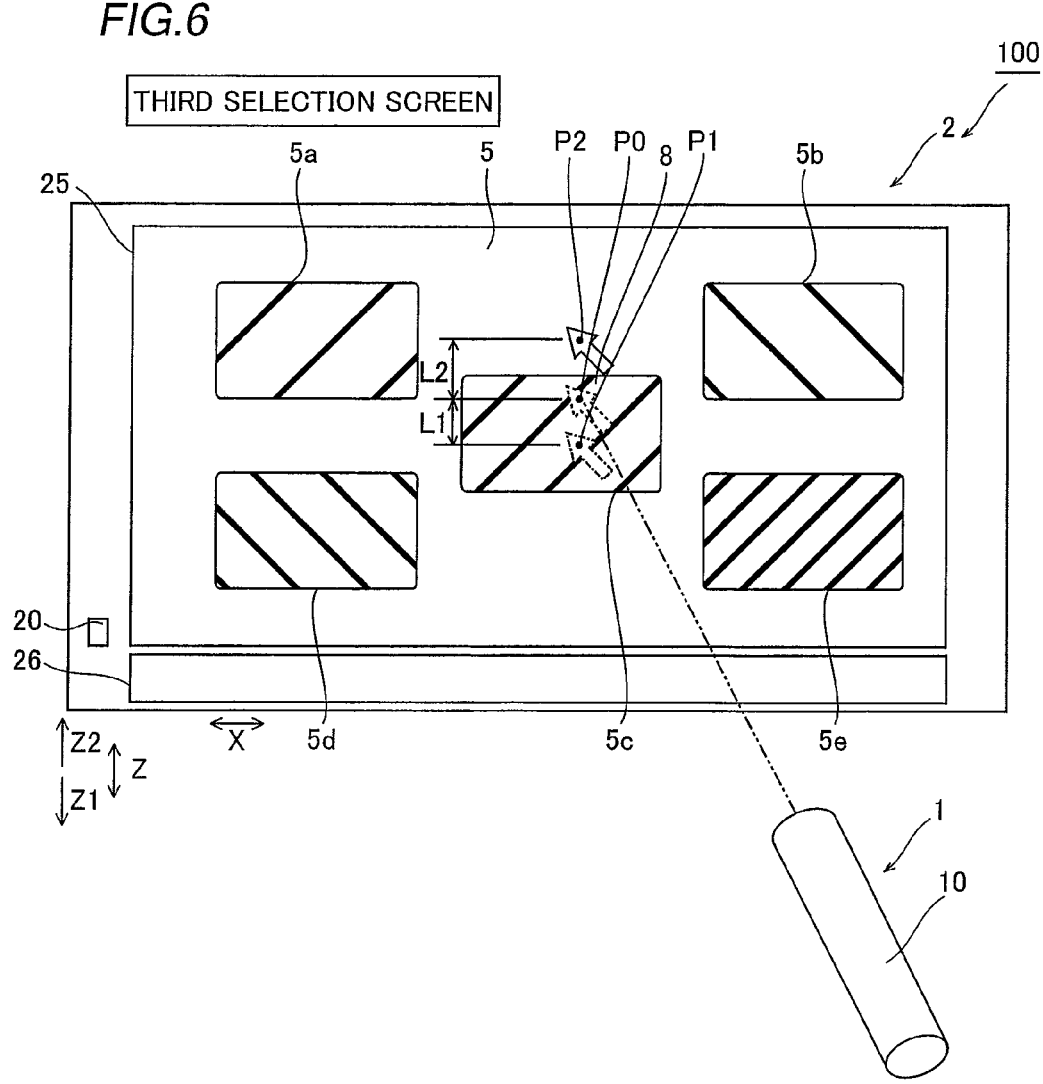

As shown in FIG. 6, the third selection screen 5 is displayed on the display screen portion 25 and five third selection regions 5a to 5e having the same rectangular shape and the pointer 8 are displayed on the third selection screen 5 by selecting the second selection region 4b (see FIG. 5). These five third selection regions 5a to 5e are automatically selected when a state where the pointer 8 is overlapped is held for one second.

According to the first embodiment, in a case where the display position (first correction position P1 (alternate long and short dash lines)) of the pointer 8 overlaps the third selection region 5c when switching from the second selection screen 4 (see FIG. 5) to the third selection screen 5, the control portion 21 obtains from a distance between the Z-coordinate of the reference position P0 stored in the storage portion 22 and a Z-coordinate of the first correction position P1 that a direction where the first correction position P1 is located with reference to the reference position P0 of the pointer 8 is the direction Z1. Then, the control portion 21 performs processing for moving the display position of the pointer 8 in the direction Z2 opposite to the direction Z1 and moving the same outside in the vicinity of the outer edge of the third selection region 5c on the side along arrow Z2 (second position correction processing), and the pointer 8 is displayed on the third selection screen 5. At this time, the display position where the pointer 8 is displayed is denoted as a second correction position P2 (solid line). The second position correction processing is so performed that the second correction position P2 is located on the side along arrow Z2 beyond the reference position P0 (broken line) which is a position before performing the first position correction processing, whereby the reference position P0 and the second correction position P2 are in a separate state by a distance L2. The direction Z2 is an example of the "second direction" in the present invention.

Figure 7:
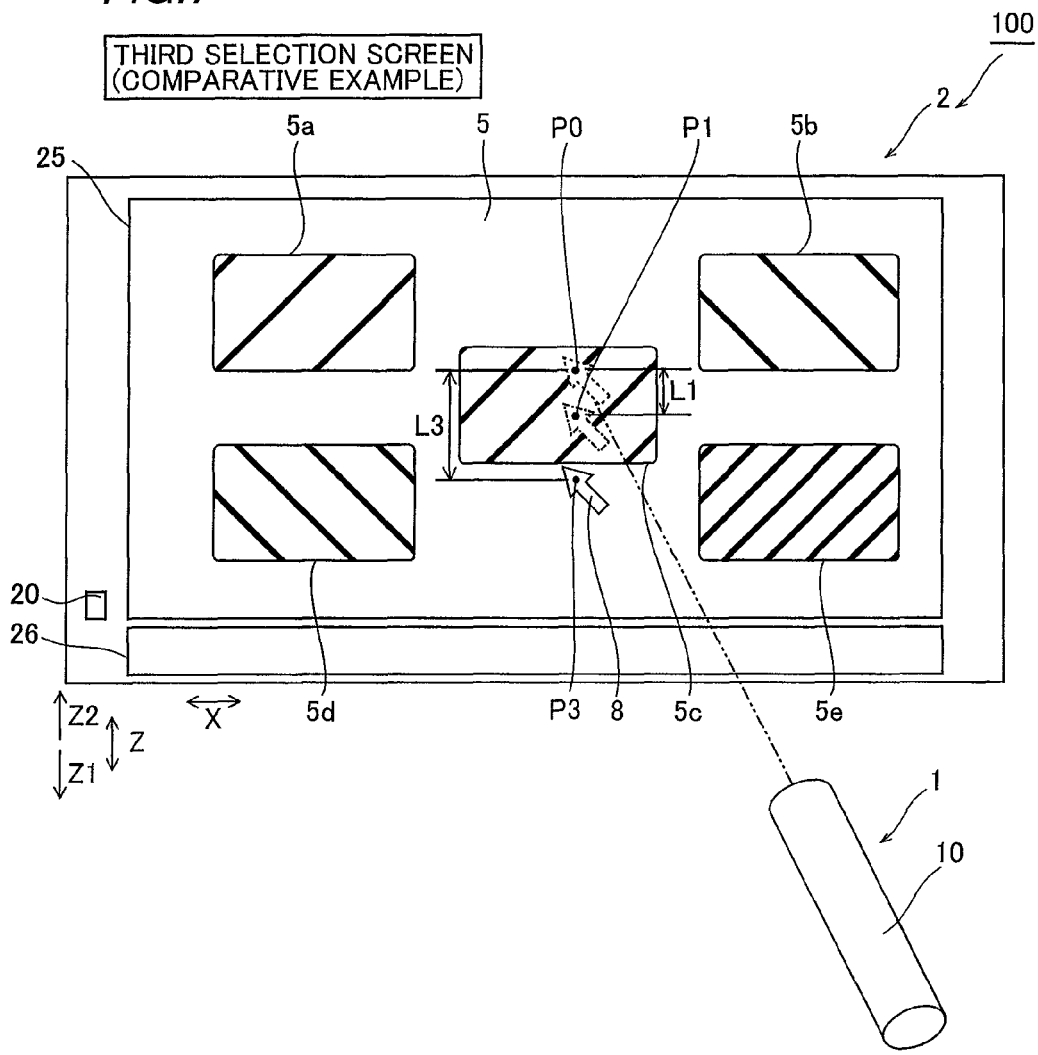

As comparative example with respect to the first embodiment, it is assumed that processing for moving the display position of the pointer 8 from the first correction position P1 (alternate long and short dash lines) in the direction Z1 identical with the direction Z1 which is a movement direction in the first position correction processing (see FIG. 4) and moving the same outside in the vicinity of the outer edge of the third selection region 5c on the side along arrow Z1 is performed by the control portion 21, as shown in FIG. 7. In this case, when the display position where the pointer 8 is displayed is the second correction position P3 (solid line), the reference position P0 (broken line) and the second correction position P3 are separated only by a distance L3. At this time, movement in the first and second position correction processing is stored, whereby the distance L3 between the reference position P0 which is the position before performing the first position correction processing and the second correction position P3 which is the position after performing the first and second position correction processing is always larger than the distance L1 between the reference position P0 and the first correction position P1. Therefore, when the user operates the pointer 8 in this state, the display position of the pointer 8 is moved from the reference position P0 before the first position correction processing to the second correction position P3 separated by the distance L3, and hence operability of the pointer 8 by the user is deteriorated.

Thus, in the first embodiment, in a case where the pointer 8 overlaps any of the second selection regions 4a to 4c of the second selection screen 4 when switching from the first selection screen 3 (see FIG. 1) to the second selection screen 4 (see FIG. 4), the control portion 21 (see FIG. 3) performs processing for not overlapping the display position of the pointer 8 with the second selection regions 4a to 4c of the second selection screen 4. When switching from the second selection screen 4 (see FIG. 5) to the third selection screen 5 (see FIG. 6), the control portion 21 performs processing for moving the display position of the pointer from the first correction position P1 (alternate long and short dash lines) in the direction Z2 opposite to the direction Z1 which is the movement direction in the first position correction processing and not overlapping the display position of the pointer 8 with the third selection regions 5a to 5e (see FIG. 6).

A control flow in the rollover operation of the liquid crystal television 2 of the input apparatus 100 according to the first embodiment of the present invention will be now described with reference to FIGS. 1 to 6 and FIGS. 8 to 10.

Figure 8:
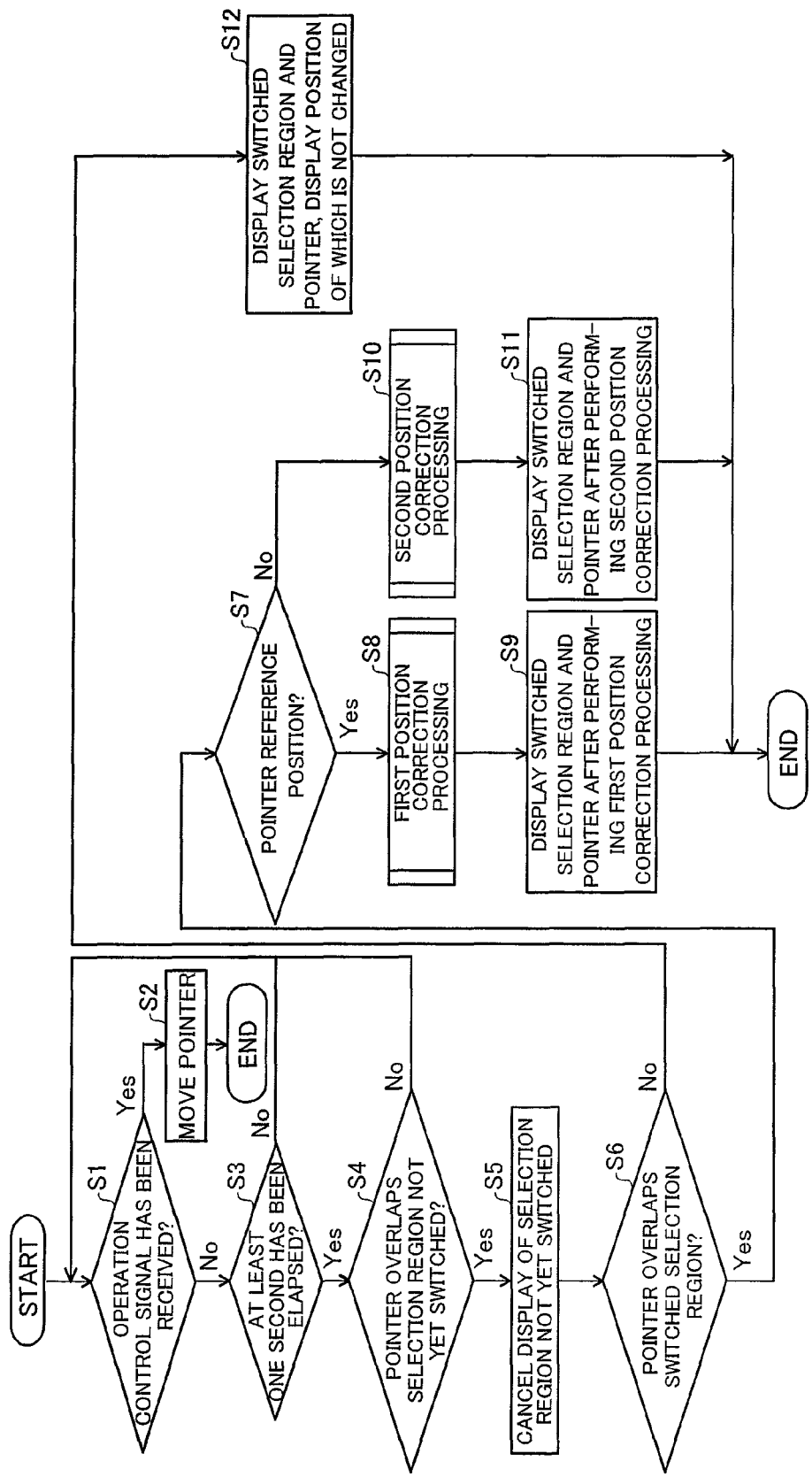
FIG. 8 is a diagram showing a control flow in a rollover operation of the liquid crystal television of the input apparatus shown in FIG. 1.

As shown in FIG. 8, the control portion 21 (see FIG. 3) of the liquid crystal television 2 determines whether or not the receiving portion 20 (see FIG. 3) has received the operation control signal (detection signal) regarding the vertical/horizontal movement of the remote controller 1 transmitted from the transmission portion 15 (see FIG. 2) at a step S1. If the control portion 21 determines that the receiving portion 20 has received the operation control signal regarding the vertical/horizontal movement of the remote controller 1 at the step S1, the process advances to a step S2, and the control portion 21 displays the pointer 8 to move on the display screen portion 25 in association with the vertical/horizontal movement of the remote controller 1 and ends this control of the liquid crystal television 2. If the control portion 21 determines that the receiving portion 20 has not received the operation control signal regarding the vertical/horizontal movement of the remote controller 1 at the step S1, the process advances to a step S3.

At the step S3, the control portion 21 determines whether or not the receiving portion 20 has received the operation control signal regarding the vertical/horizontal movement of the remote controller 1 for at least one second. If the control portion 21 determines that the receiving portion 20 has not received the operation control signal for at least one second at the step S3, the process advances to a step S4. If the control portion 21 determines that the receiving portion 20 has received the operation control signal for less than one second at the step S3, the process returns to the step S1.

At a step S4, the control portion 21 determines whether or not the pointer 8 overlaps the selection region not yet switched (the first selection regions 3a to 3d in FIG. 1 and the second selection regions 4a to 4c in FIG. 5). At this time, the control portion 21 determines whether or not coordinates in a plane surface consisting of the directions X and Z of the display position of the pointer 8 are in a region formed by coordinates in the plane surface consisting of the directions X and Z of four corners of the selection region not yet switched. If the control portion 21 determines that the pointer 8 overlaps the selection region not yet switched at the step S4, the process advances to a step S5, and display of the screen not yet switched (the first selection screen 3 in FIG. 1 and the second selection screen 4 in FIG. 5) is cancelled on the display screen portion 25. Then, the process advances to a step S6. If the control portion 21 determines that the pointer 8 does not overlap the selection region not yet switched at the step S4, the process returns to the step S1.

At the step S6, the control portion 21 determines whether or not the pointer 8 overlaps the switched selection region (the second selection regions 4a to 4c in FIG. 4 and the third selection regions 5a to 5e in FIG. 6). If the control portion 21 determines that the pointer 8 overlaps the switched selection region at the step S6, the process advances to a step S7. If the control portion 21 determines that the pointer 8 does not overlap the switched selection region at the step S6, the process advances to a step S12.

Figure 9:
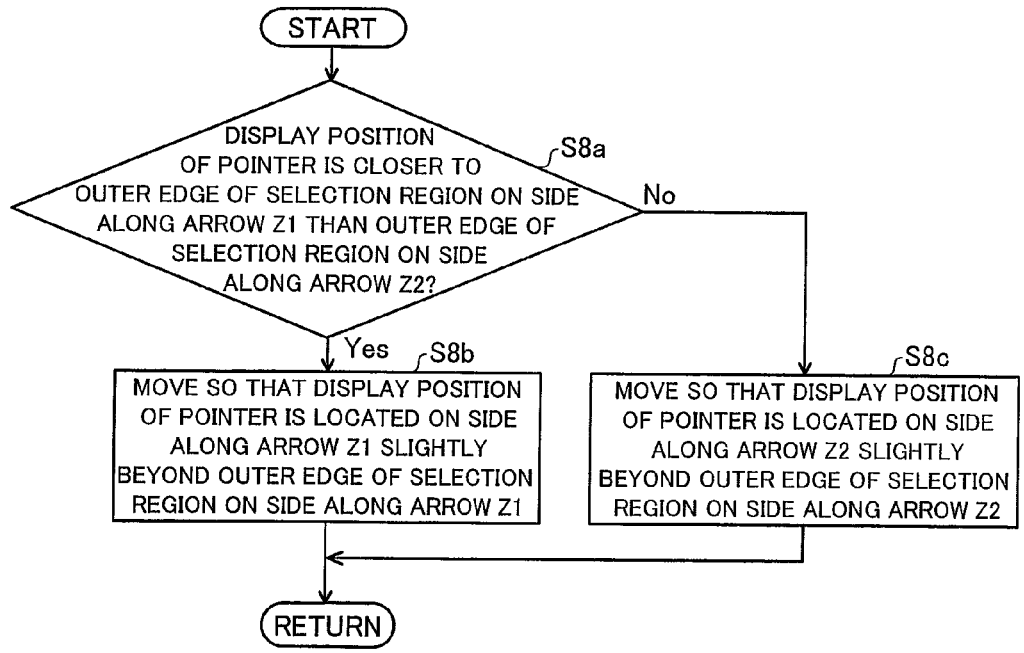
FIG. 9 is a diagram showing a control flow of a first position correction processing of the liquid crystal television of the input apparatus shown in FIG. 1.
Figure 10:
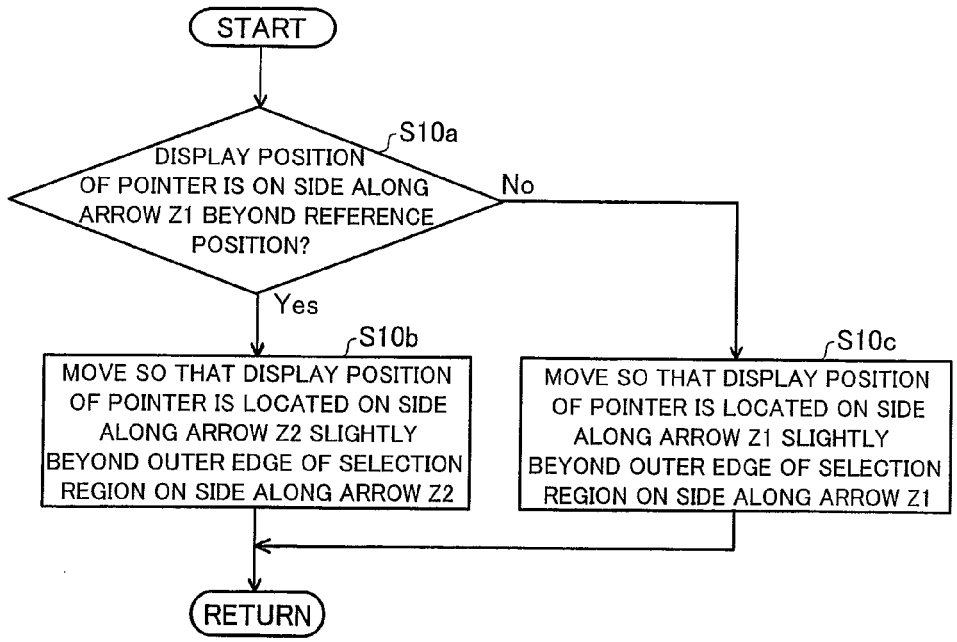
FIG. 10 is a diagram showing a control flow of a second position correction processing of the liquid crystal television of the input apparatus shown in FIG. 1.

At the step S7, the control portion 21 determines whether or not the display position of the pointer 8 is the reference position P0 which is the position before performing the first position correction processing. If the control portion 21 determines that the display position of the pointer 8 is the reference position P0 at the step S7, the process advances to a step S8, and the first position correction processing shown in FIG. 9 is performed. If the control portion 21 determines that the display position of the pointer 8 is not the reference position P0 at the step S7, the process advances to a step S10, and the second position correction processing shown in FIG. 10 is performed.

In the first position correction processing shown in FIG. 9, the control portion 21 determines whether or not the display position of the pointer 8 (reference position P0) is closer to the outer edge of the switched selection region (second selection regions 4a to 4c in FIG. 4) on the side along arrow Z1 than the outer edge of the switched selection region on the side along arrow Z2 at a step S8a. At this time, the control portion 21 determines by comparing the distance between the Z-coordinate of the reference position P0 of the pointer 8 and the Z-coordinate of the outer edge of the switched selection region on the side along arrow Z2 with the distance between the Z-coordinate of the reference position P0 of the pointer 8 and the Z-coordinate of the outer edge of the switched selection region on the side along arrow Z1.

If the control portion 21 determines that the reference position P0 of the pointer 8 is closer to the outer edge of the switched selection region on the side along arrow Z1 than the outer edge of the switched selection region on the side along arrow Z2 at the step S8a, the process advances to a step S8b, and the control portion 21 so moves the display position of the pointer 8 from the reference position P0 that the display position is located slightly outside on the side along arrow Z1 beyond the outer edge of the switched selection region on the side along arrow Z1. Then, the process advances to a step S9 shown in FIG. 8. If the control portion 21 determines that the reference position P0 of the pointer 8 is closer to the outer edge of the switched selection region on the side along arrow Z2 than the outer edge of the switched selection region on the side along arrow Z1 at the step S8a, the process advances to a step S8c, and the control portion 21 so moves the display position of the pointer 8 from the reference position P0 that the display position is located slightly outside on the side along arrow Z2 beyond the outer edge of the switched selection region on the side along arrow Z2. Then, the process advances to the step S9 shown in FIG. 8.

At the step S9, the control portion 21 displays the switched screen (second selection screen 4 in FIG. 4) on the display screen portion 25 and displays the switched selection region (second selection regions 4a to 4c in FIG. 4) and the pointer 8, the display position of which is moved on the basis of the first position correction processing performed at the step S8, on the switched screen, and this control of the liquid crystal television 2 ends, as shown in FIG. 8.

If the control portion 21 determines that the display position of the pointer 8 is not the reference position P0 at the step S7, the process advances to the step S10, and the second position correction processing shown in FIG. 10 is performed. In the second position correction processing, the control portion 21 determines whether or not the display position of the pointer 8 (the first correction position P1 in FIG. 5) is located on the side along arrow Z1 beyond the reference position P0 which is the position before performing the first position correction processing at a step S10a. At this time, the control portion 21 determines whether or not the first correction position P1 is located on the side along arrow Z1 beyond the reference position P0 by comparing the Z-coordinate of the reference position P0 of the pointer 8 stored in the storage portion 22 with the Z-coordinate of the first correction position P1.

If the control portion 21 determines that the first correction position P1 of the pointer 8 is located on the side along arrow Z1 beyond the reference position P0 at the step S10a, the process advances to a step S10b and the control portion 21 so moves that the display position of the pointer 8 is located slightly outside on the side along arrow Z2 beyond the outer edge of the switched selection region (third selection regions 5a to 5e in FIG. 6) on the side along arrow Z2. Then, the process advances to a step S11 shown in FIG. 8. If the control portion 21 determines that the first correction position P1 of the pointer 8 is located on the side along arrow Z2 beyond the reference position P0 at the step S10a, the process advances to a step S10c, and the control portion 21 so moves that the display position of the pointer 8 is located slightly outside on the side along arrow Z1 beyond the outer edge of the switched selection region on the side along arrow Z1. Then, the process advances to the step S11 shown in FIG. 8.

At the step S11, the control portion 21 displays the switched screen (the third selection screen 5 in FIG. 6) on the display screen portion 25 and displays the switched selection region (the third selection regions 5a to 5e in FIG. 6) and the pointer 8, the display position of which is moved on the basis of the second position correction processing performed at the step S10, on the switched screen, and this control of the liquid crystal television 2 ends.

If the control portion 21 determines that the pointer 8 does not overlap the switched selection region at the step S6, the process advances to a step S12, and the control portion 21 displays the switched screen (not shown) on the display screen portion 25 and displays the switched selection region (not shown) and the pointer 8, the display position of which is not changed, on the switched screen at the step S12, and this control of the liquid crystal television 2 ends.

According to the first embodiment, as hereinabove described, the control portion 21 performs the processing (first position correction processing) for moving the display position of the pointer 8 in the direction Z1 from the reference position P0 which is the position before performing the first position correction processing, and moving outside in the vicinity of the outer edge of the second selection region 4a on the side along arrow Z1, whereby the display position of the pointer 8 can be moved from the reference position P0 to the first correction position P1 so as not to overlap the second selection region 4a of the second selection screen 4, and hence the second selection region 4a can be prevented from being selected when the state where the pointer 8 overlaps the second selection region 4a is held for one second contrary to intension of the user.

According to the first embodiment, as hereinabove described, the display position of the pointer 8 is moved in the direction Z1 from the reference position P0 when the distance between the reference position P0 of the pointer 8 and the outer edge of the second selection region 4a on the side along arrow Z1 is smaller than the distance between the reference position P0 of the pointer 8 and the outer edge of the second selection region 4a on the side along arrow Z2, whereby the display position of the pointer 8 can be moved to the outside of the second selection region 4a in the closest direction so as not to overlap the second selection region 4a, and hence the quantity of movement of the display position of the pointer 8 can be reduced. Thus, the user can be unlikely to lose the display position of the pointer 8.

According to the first embodiment, as hereinabove described, the control portion 21 obtains from the Z-coordinate of the reference position P0 of the pointer 8 stored in the storage portion 22 and the Z-coordinate of the first correction position P1 that the direction where the first correction position P1 is located with reference to the reference position P0 of the pointer 8 is the direction Z1, thereby performing the processing (second position correction processing) for moving the display position of the pointer 8 from the first correction position P1 which is the direction after performing the first position correction processing in the direction Z2 opposite to the direction Z1 which is the movement direction in the first position correction processing, and moving the display position of the pointer 8 outside in the vicinity of the outer edge of the third selection region 5c on the side along arrow Z2, whereby the display position of the pointer 8 moved in the direction Z1 when the first selection region 3c is selected to be switched to the second selection screen 4 can be more easily moved in the direction Z2 opposite to the direction Z1 by the control portion 21 when the second selection region 4b is selected to be switched to the third selection screen 5. Thus, the display position of the pointer 8 (second correction position P2) after moving in the direction Z2 can be inhibited from moving away from the display position of the pointer 8 (reference position P0) before moving in the direction Z1 while avoiding overlap of the display position of the pointer 8 with the third selection regions 5a to 5e, and deterioration of operability of the pointer 8 by the user resulting from movement of the display position of the pointer 8 in the direction Z1 when the first selection region 3c is selected to be switched to the second selection screen 4 can be suppressed.

According to the first embodiment, as hereinabove described, the control portion 21 is so formed that if determining that the pointer 8 does not overlap the switched selection region, the switched screen is displayed on the display screen portion 25, and the switched selection region and the pointer 8, the display position of which is not changed, are displayed on the switched screen, whereby the display position of the pointer 8 can be inhibited from changing every time the screen is switched. Thus, the user may not correspond to change of the display position every time the display position of the pointer 8 changes, and hence deterioration of operability can be suppressed.

According to the first embodiment, as hereinabove described, the first correction position P1 which is the display position of the pointer 8 is moved outside in the vicinity of the outer edge of the second selection region 4a on the side along arrow Z1, and the second correction position P2 which is the display position of the pointer 8 is moved outside in the vicinity of the outer edge of the third selection region 5c on the side along arrow Z2, whereby the distance of the movement of the pointer 8 can be reduced as compared with a case where the display position of the pointer 8 (the first correction position P1 and the second correction position P2) is moved to the position separated from the outer edge of the selection region (the second selection region 4a and the third selection region 5c) by the control portion 21, and hence the user can be inhibited from losing the display position of the pointer 8.

According to the first embodiment, as hereinabove described, the display position of the pointer 8 is moved not horizontally (in the direction X) in which the second selection regions 4a to 4c are adjacent to each other but vertically (in the direction Z), whereby the display position of the pointer can be inhibited from overlapping the adjacent second selection regions 4a to 4c on a destination due to the horizontally adjacent second selection regions 4a to 4c in a case where horizontal intervals between the second selection regions 4a to 4c are small.

According to the first embodiment, as hereinabove described, the remote controller 1 and the liquid crystal television 2 including the display screen portion 25 and the control portion 21 are separately provided, and an input operation is transmitted from the remote controller 1 to the liquid crystal television 2 by radio communication, whereby the size of the remote controller 1 can be reduced and no cable for transmitting a signal is required, and hence the user can easily operate the remote controller 1 for the input operation.

According to the first embodiment, as hereinabove described, the vertical/horizontal movement of the remote controller 1 detected by the acceleration sensor 11 is transmitted to the liquid crystal television 2, and the processing to the operation control signal (detection signal) is performed on the control portion 21 of the liquid crystal television 2, whereby the user can operate the display position of the pointer 8 in association of the vertical/horizontal movement of the remote controller 1, and hence an input operation for moving and overlapping the display position of the pointer 8 with the selection region can be more easily operated by the remote controller 1. The detection signal which is the radio signal is transmitted from the remote controller 1 to the liquid crystal television 2, whereby the remote controller 1 can be easily three-dimensionally moved dissimilarly to a case where cables are connected to each other. Thus, the user can freely operate the remote controller 1.

Second Embodiment

A second embodiment will be now described with reference to FIGS. 11 to 17. In an input apparatus 200 according to this second embodiment, a reset button 216 is provided on a remote controller 201 and a pointer storage region 209 is arranged on a display screen portion 25 of a liquid crystal television 2, dissimilarly to the aforementioned first embodiment. The remote controller 201 is an example of the "operating portion" in the present invention.

A structure of the input apparatus 200 according to the second embodiment of the present invention will be now described with reference to FIGS. 11 to 16.

Figure 11:
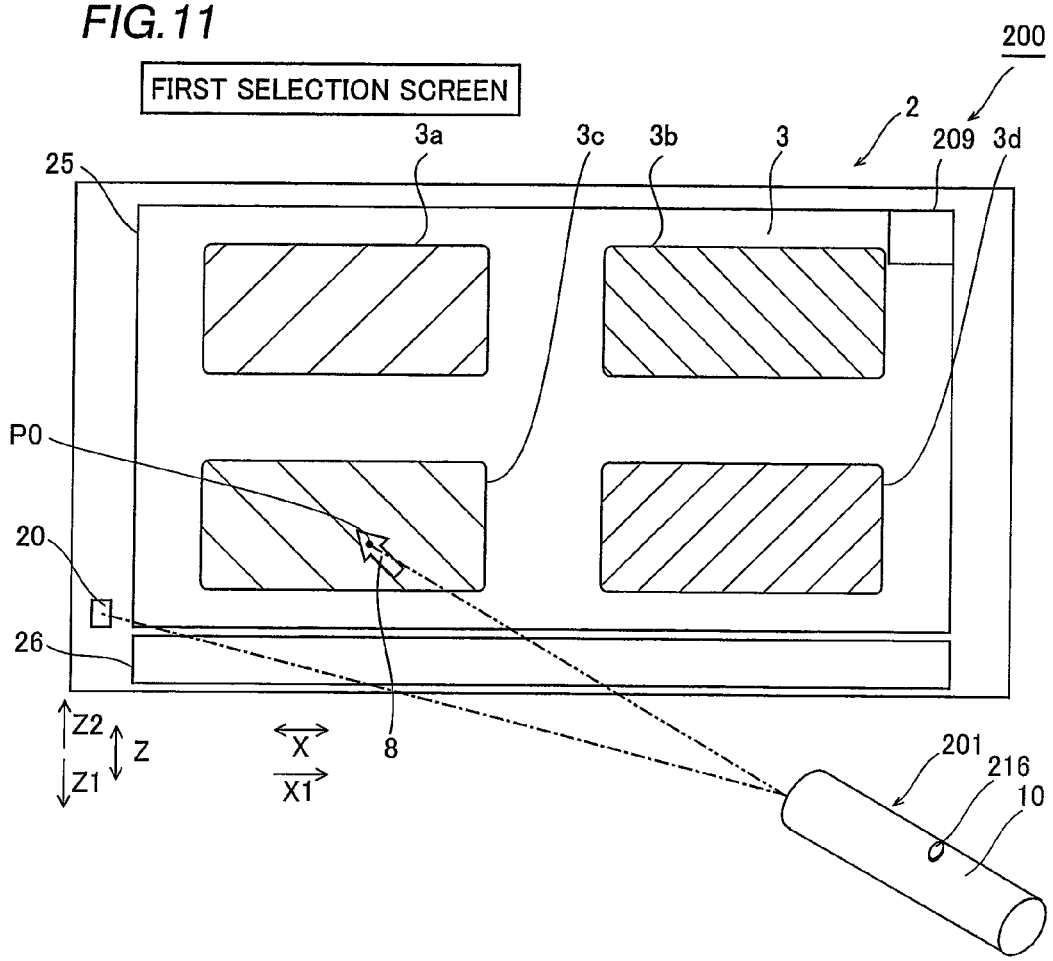
FIG. 11 is a diagram showing an overall structure of an input apparatus according to a second embodiment of the present invention.
Figure 12:
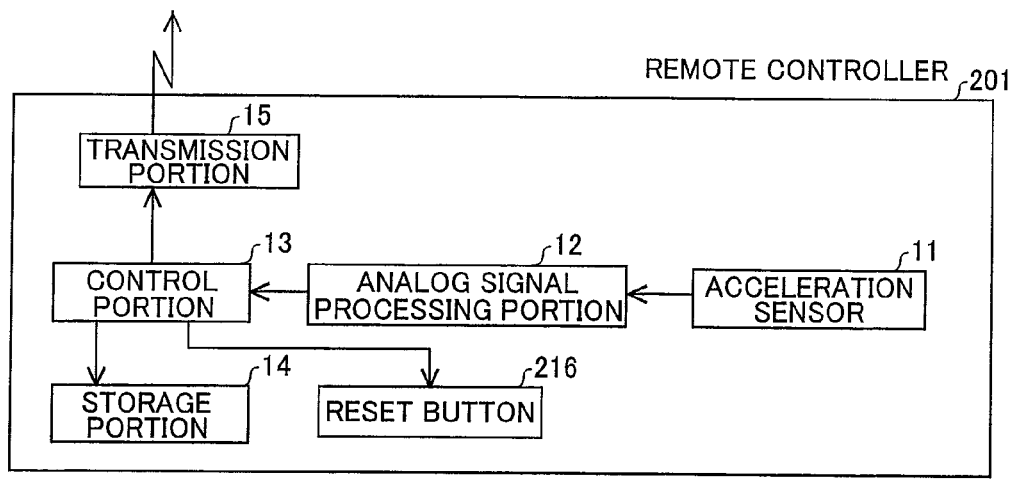
FIG. 12 is a block diagram showing a structure of a remote controller of the input apparatus shown in FIG. 11.

The reset button 216 is provided on a surface of a housing 10 of the remote controller 201 of the input apparatus 200 according to the second embodiment of the present invention, as shown in FIG. 11. As shown in FIG. 12, a control portion 13 has a function of transmitting a digital signal regarding press of the reset button 216 from a transmission portion 15 to the outside as an operation control signal (detection signal), employing a radio signal (RF (radio frequency) signal). The press of the reset button 216 is an example of the "reset operation" in the present invention.

As shown in FIG. 11, the pointer storage region 209 is displayed to be arranged in the vicinity of a corner of the display screen portion 25 of the liquid crystal television 2 on a side along arrows X1 and Z2. This pointer storage region 209 is displayed on the same position in displaying any of a first selection screen 3, a second selection screen 4 (see FIGS. 13 and 14) and a third selection screen 5 (see FIGS. 15 and 16), and is displayed to be arranged on a position not to overlap any of first selection regions 3a to 3d, second selection regions 4a to 4c (see FIGS. 13 and 14) and third selection regions 5a to 5e (see FIGS. 15 and 16). The remaining structure of the second embodiment is similar to that of the aforementioned first embodiment.

An outline of a rollover operation of the input apparatus 200 according to the second embodiment of the present invention will be now described with reference to FIGS. 11 to 16.

As shown in FIG. 11, the first selection screen 3 is displayed on the display screen portion 25. Four first selection regions 3a to 3d having the same rectangular shape, the pointer 8 and the pointer storage region 209 are displayed on this first selection screen 3. A display position where the pointer 8 is displayed is denoted as a reference position P0. In the second embodiment, a case where the first selection region 3c is automatically selected by holding the state where the pointer 8 overlaps the first selection region 3c for one second by the user shown in FIG. 11 will be described.

Figure 13:
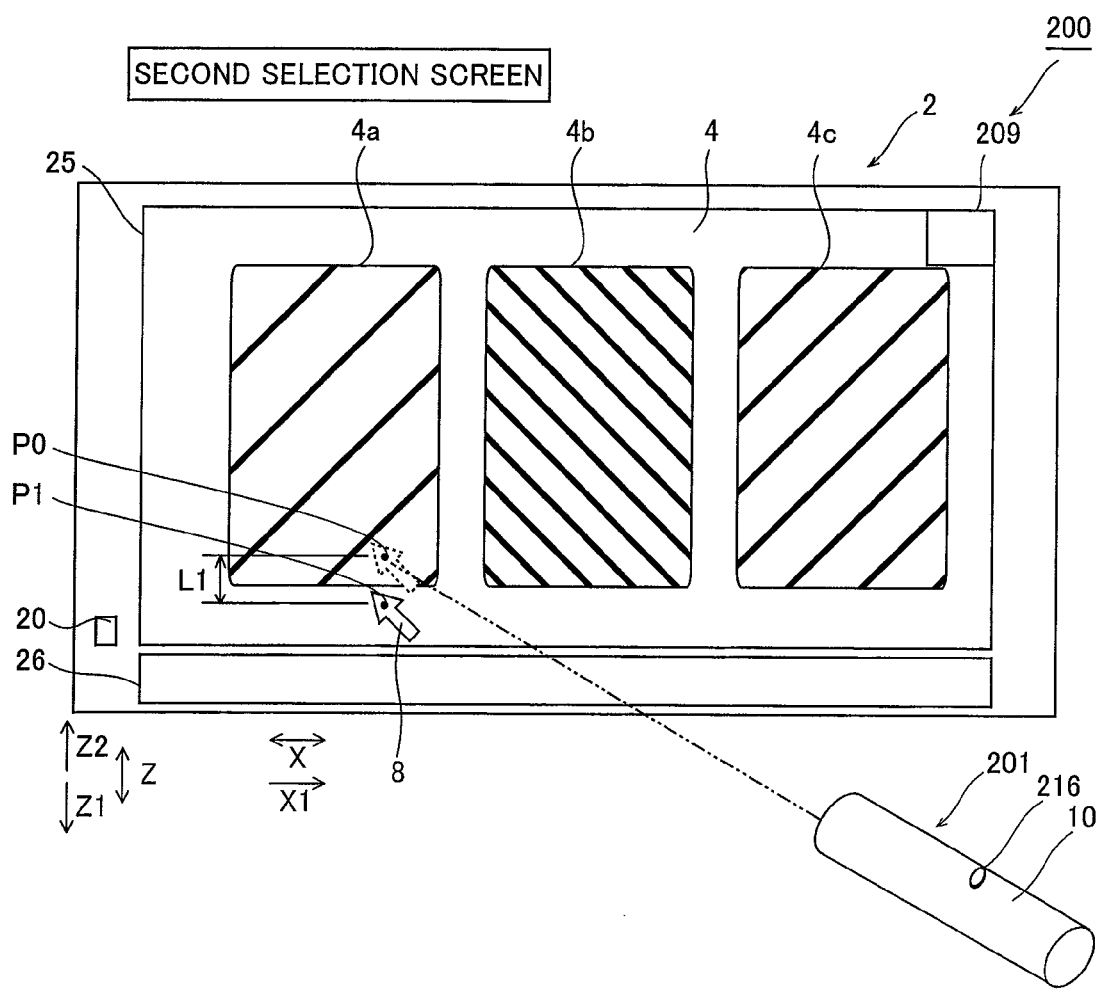
FIGS. 13 to 16 are diagrams for illustrating a display position of a pointer in a rollover operation of the input apparatus shown in FIG. 11.

As shown in FIG. 13, the second selection screen 4 is displayed on the display screen portion 25 and the three second selection regions 4a to 4c having the same rectangular shape, the pointer 8 and the pointer storage region 209 are displayed on the second selection screen 4 by selecting the first selection region 3c.

In a case where the display position (reference position P0 (broken line)) of the pointer 8 overlaps the second selection region 4a of the second selection screen 4 when switching from the first selection screen 3 (see FIG. 11) to the second selection screen 4, the control portion 21 (see FIG. 12) performs the processing (first position correction processing) for moving the display position of the pointer 8 in the direction Z1 from the reference position P0 and moving outside in the vicinity of the outer edge of the second selection region 4a on the side along arrow Z1, and the pointer 8 is displayed on the second selection screen 4. At this time, the display position where the pointer 8 is displayed is denoted as the first correction position P1. The reference position P0 and the first correction position P1 are in a separated state in a direction Z by a distance L1.

Figure 14:
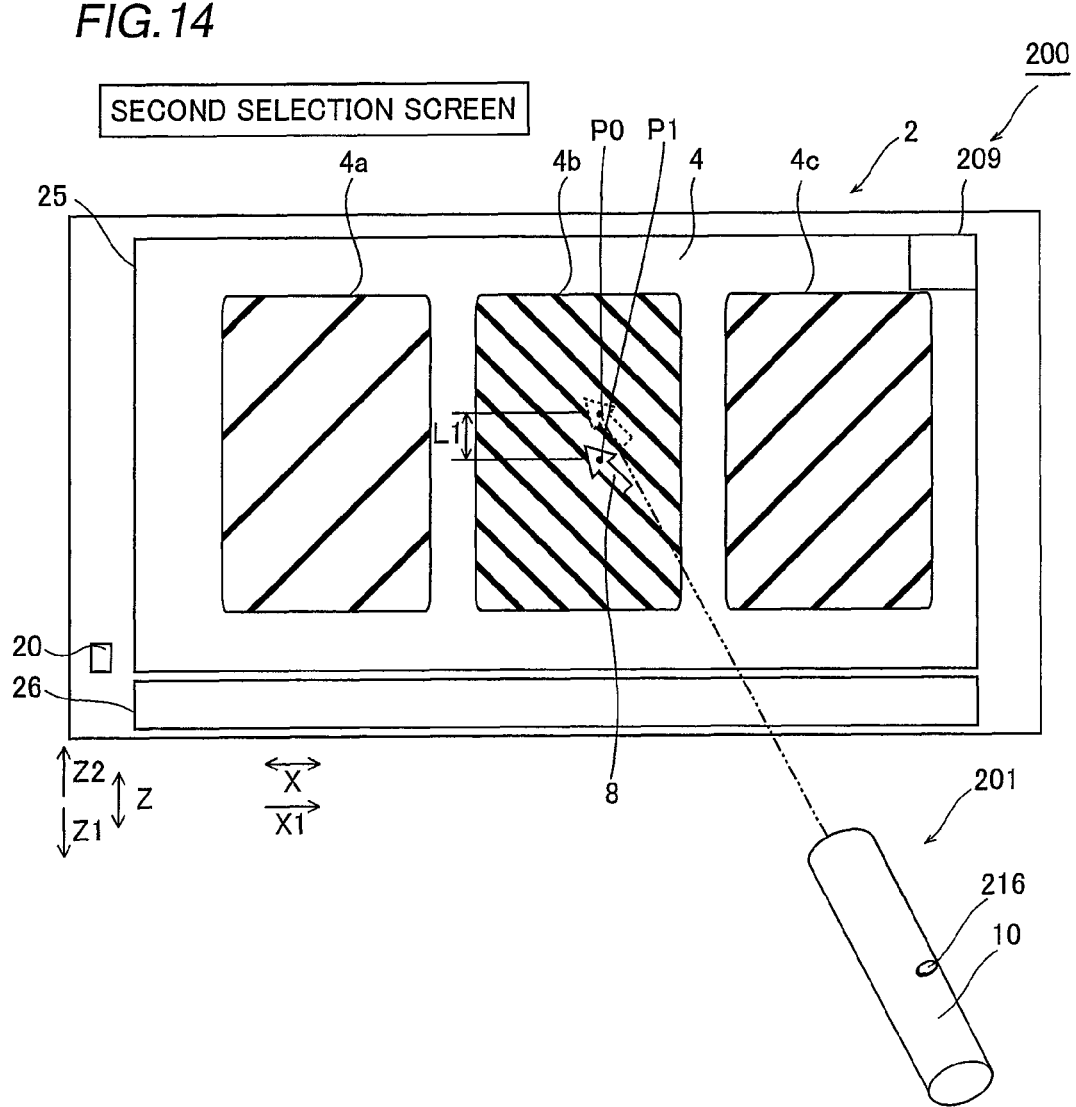
Figure 15:
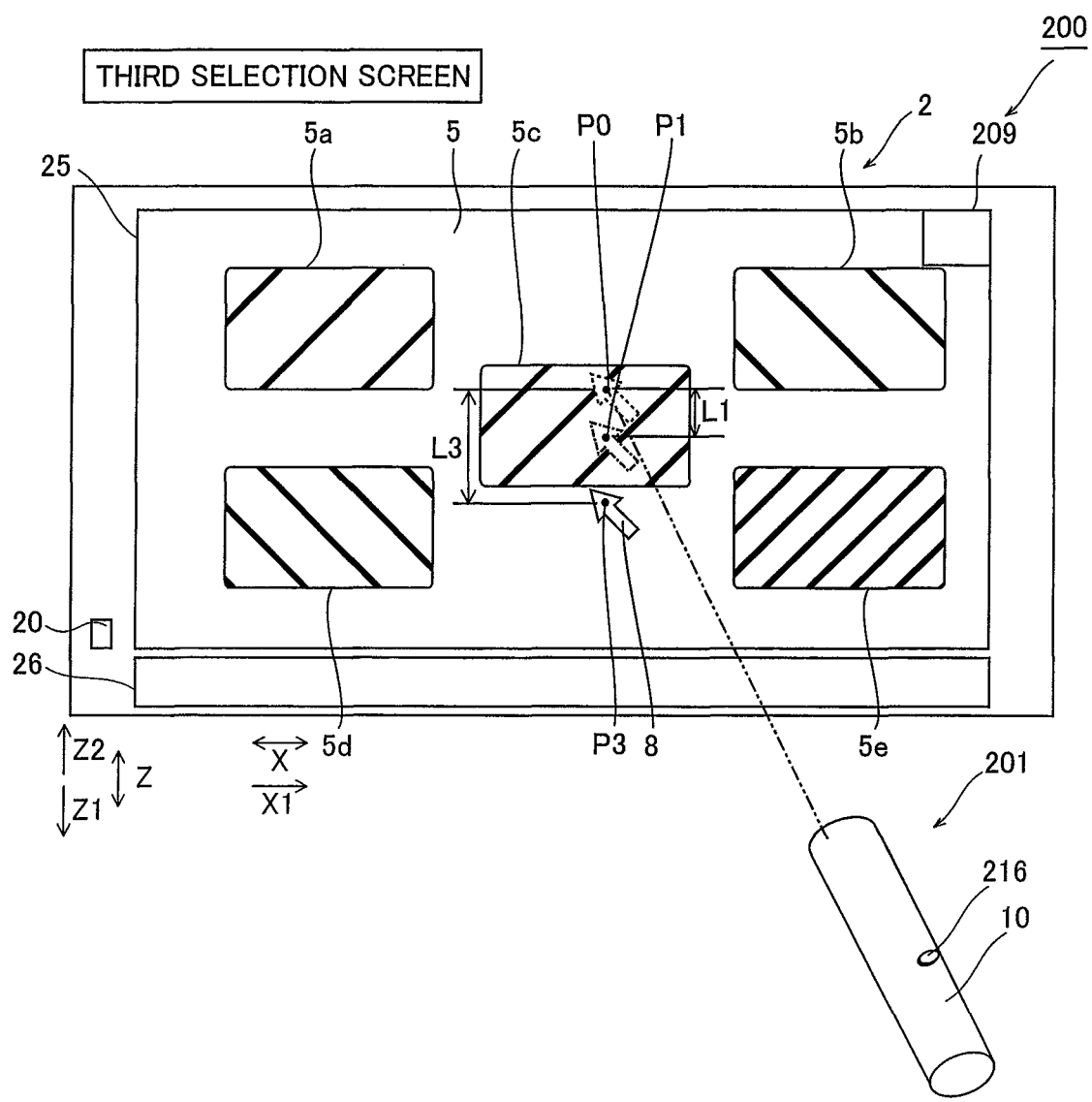

In the second embodiment, a case where the second selection region 4b is automatically selected by holding a state where the pointer 8 overlaps the second selection region 4b for one second, after moving the pointer 8 subjected to the first position correction processing into the second selection region 4b of the second selection screen 4 by the user as shown in FIG. 14 will be described. As shown in FIG. 15, the third selection screen 5 is displayed on the display screen portion 25, and the five third selection regions 5a to 5e having the same rectangular shape, the pointer 8 and the pointer storage region 209 are displayed on the third selection screen 5 by selecting the second selection region 4b.

In a case where the pointer 8 is displayed to overlap the third selection region 5c when switching from the second selection screen 4 (see FIG. 14) to the third selection screen 5, the control portion 21 performs processing for moving the display position of the pointer 8 from the first correction position P1 (alternate long and short dash lines), which is a position after performing the first position correction processing, in the direction Z1 and moving the same outside in the vicinity of an outer edge of the third selection region 5c on the side along arrow Z1, and the pointer 8 is displayed on the third selection screen 5. At this time, assuming that the display position where the pointer 8 is displayed is denoted as a second correction position P3 (solid line), the reference position P0 (broken line) and the second correction position P3 are in a separated state by a distance L3.

Figure 16:
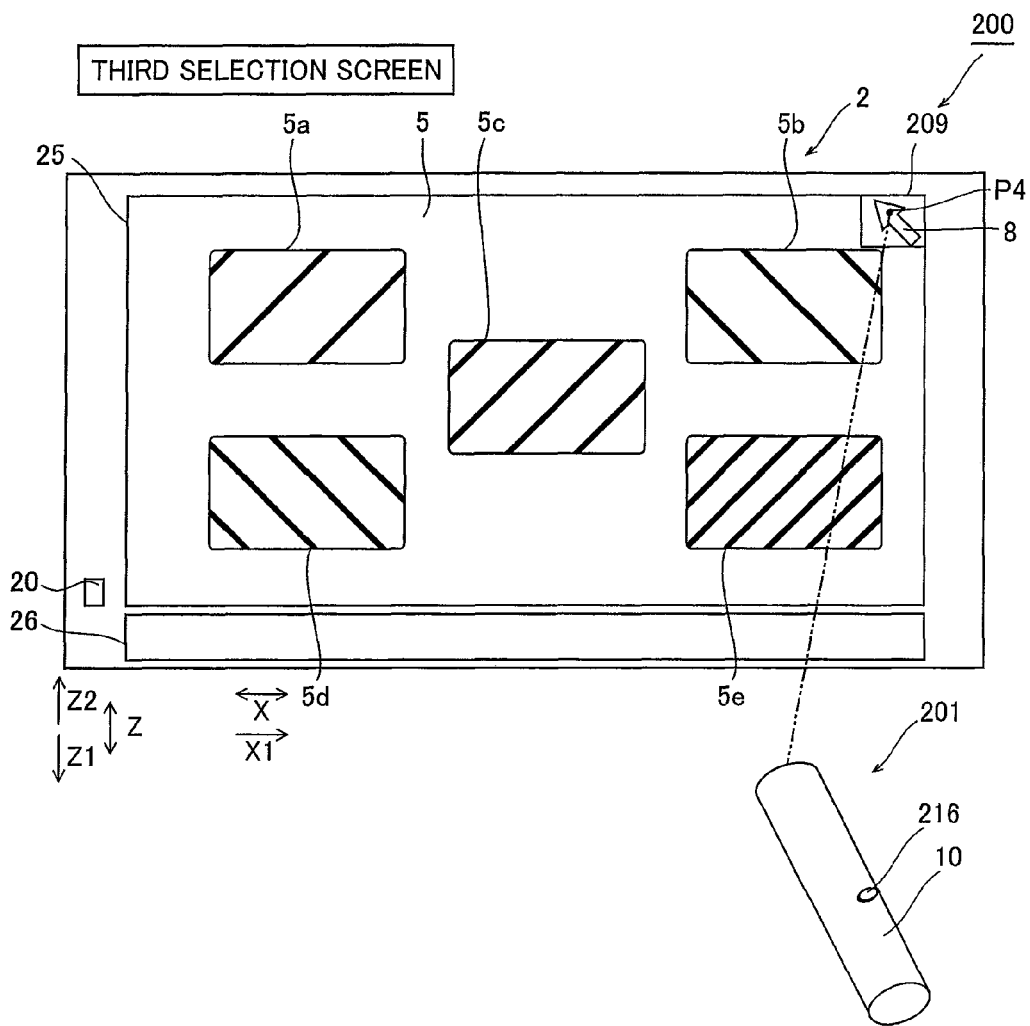

In the second embodiment, if the control portion 21 determines that the receiving portion 20 has received the operation control signal indicating that the user (not shown) has pressed the reset button 216 of the remote controller 201, the display position of the pointer 8 is moved to the pointer storage region 209 arranged in the vicinity of the corner of the display screen portion 25 on the side along arrows X1 and Z2, as shown in FIG. 16. At this time, the pointer 8 is displayed not on the second correction position P3 which is the display position of the pointer but on a new reference position P4.

A control flow in pressing the reset button 216 of the liquid crystal television 2 of the input apparatus 200 according to the second embodiment of the present invention will be now described with reference to FIGS. 3, 12 and 17.

As shown in FIG. 17, the control portion 21 (see FIG. 3) of the liquid crystal television 2 determines whether or not the receiving portion 20 (see FIG. 3) has received the operation control signal regarding the press of the reset button 216 of the remote controller transmitted from the transmission portion 15 (see FIG. 12) at a step S201. If the control portion 21 determines that the receiving portion 20 has received the operation control signal regarding the press of the receiving portion 20 at the step S201, the process advances to a step S202, and the control portion 21 moves the display position of the pointer 8 to the pointer storage region 209 and ends this control of the liquid crystal television 2. If the control portion 21 determines that the receiving portion 20 has not received the operation control signal regarding the press of the reset button 216 at the step S201, the control portion 21 repeats control of the step S201.

The aforementioned control of the press of the reset button 216 of the liquid crystal television 2 is given priority over the control in the rollover operation of the liquid crystal television 2 of the first embodiment shown in FIG. 8. In other words, when the reset button 216 is pressed in performing control in the rollover operation of the liquid crystal television 2, the control portion 21 stops the control in the rollover operation and performs control in pressing the reset button 216. The control portion 21 is formed to perform control (step S1 in FIG. 8) in the rollover operation of the liquid crystal television 2 again from the start when ending the control in the pressing the reset button 216.

According to the second embodiment, as hereinabove described, the display position of the pointer 8 is located on the pointer storage region 209 arranged in the vicinity of the corner of the display screen portion 25 on the side along arrows X1 and Z2 if the control portion 21 determines that the receiving portion 20 has received the operation control signal indicating that the reset button 216 of the remote controller 201 was operated, whereby the user can move the display position of the pointer 8 to the pointer storage region 209 by operating the reset button 216, and hence the user can resume an operation from the display position of the pointer 8 (reference position P4) moved to the pointer storage region 209 also when the display position of the pointer 8 was lost during the operation. The pointer storage region 209 can inhibit the position allowing display of the selection region (the first selection regions 3a to 3d, the second selection regions 4a to 4c and the third selection regions 5a to 5e) in the display screen portion 25 from restriction as compared with a case where the pointer storage region 209 is arranged on a position other than the position in the vicinity of the corner of the display screen portion 25, and hence the degree of freedom in layout of the selection region in the display screen portion 25 can be improved.

According to the second embodiment, as hereinabove described, the pointer storage region 209 is arranged on the position not to overlap any of the first, second and third selection screens 3, 4 and 5, whereby selection of the first selection regions 3a to 3d, the second selection regions 4a to 4c and the third selection regions 5a to 5e can be prevented when the pointer 8 is located on the pointer storage region 209.

According to the second embodiment, as hereinabove described, the reset button 216 is provided on the surface of the housing 10 of the remote controller 201, whereby the user can perform the reset operation only by pressing the reset button 216 without further operating the selection region and the like displayed on the display screen portion 25, and hence the pointer 8 can be easily displayed in the pointer storage region 209 when the user lost the pointer 8.

According to the second embodiment, as hereinabove described, the control portion 21 stops the control in the rollover operation and performs the control in pressing the reset button 216, when the reset button 216 is pressed during the control in the rollover operation of the liquid crystal television 2 is performed, whereby the user can further promptly resume an input operation from the display position of the pointer 8 moved to the pointer storage region 209 also when the user lost the pointer 8. The remaining effects of the second embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the input apparatus of the present invention comprises the remote controller and the liquid crystal television in each of the aforementioned first and second embodiments, the present invention is not restricted to this. The present invention is not restricted to the input apparatus comprising the remote controller and the liquid crystal television so far as the input apparatus comprising an operating portion, a display screen portion and a control portion, but an input apparatus comprising a mouse and a PC (personal computer) may be applicable.

While no operating button is provided on the remote controller in the aforementioned first embodiment, the present invention is not restricted to this. In the present invention, an operating button may be provided on the remote controller. At this time, the input apparatus of the present invention is so formed that the selection region is automatically selected when the state where the pointer is overlapped is held for at lease one second (rollover operation), and hence a selection button for selecting the selection region may not be provided. Thus, the number of the operating buttons of the remote controller can be reduced.

While the control portion moves the display position (first correction position P1) of the pointer in the direction Z1 from the reference position P0 which is the position before performing the first position correction processing, when switching from the first selection screen to the second selection screen in each of the aforementioned first and second embodiments, the present invention is not restricted to this. In the present invention, the control portion may move the display position of the pointer in the direction Z2 from the reference position P0 when switching from the first selection screen to the second selection screen. Alternatively, the display position of the pointer may be moved either one of the direction X, or may be moved in an oblique direction in a plane surface consisting of the direction X and the direction Z.

While the distance between the reference position P0 of the pointer 8 and the outer edge of the second selection region 4a on the side along arrow Z1 compares with the distance between the reference position P0 of the pointer 8 and the outer edge of the second selection region 4a on the side along arrow Z2 and the display position of the pointer is moved in the direction (along arrow Z1) where the distance is smaller in each of the aforementioned first and second embodiments, the present invention is not restricted to this. In the present invention, the display position of the pointer may be moved in a direction where the distance is larger so far as the display position of the pointer is moved outside the selection region.

While the distance between the reference position P0 of the pointer 8 and the outer edge of the second selection region 4a on the side along arrow Z1 is compared with the distance between the reference position P0 of the pointer 8 and the outer edge of the second selection region 4a on the side along arrow Z2 in each of the aforementioned first and second embodiments, the present invention is not restricted to this. In the present invention, distances between the reference position of the pointer and outer edges of the selection region in at least three directions may be obtained, and the display position of the pointer may be moved in the direction where the distance is the smallest among the obtained distances.

While the second correction position P2 which is the display position of the pointer is moved in the direction Z2 from the first correction position P1 which is the position after performing the first position correction processing when the control portion is switched from the second selection screen to the third selection screen in the aforementioned first embodiment, the present invention is not restricted to this. In the present invention, the movement is not restricted to the movement in the direction Z2 so far as the control portion moves the display position of the pointer in the direction opposite to the direction for directing to the first correction position P1 from the reference position.

While the control portion does not change the display position of the pointer when the pointer does not overlap the switched selection region in each of the aforementioned first and second embodiments, the present invention is not restricted to this. In the present invention, the control portion may move the display position of the pointer in the direction opposite to the movement direction in the first position correction processing from the first correction position P1 which is the position after performing the first position correction processing, and move so that the display position of the pointer does not overlap the third selection region, also in a case where the pointer does not overlap the switched selection region when switching from the second selection screen to the third selection screen.

While the control portion moves the display position of the pointer when switching from the first selection screen to the second selection screen and when switching from the second selection screen to the third selection screen in the aforementioned first embodiment, the present invention is not restricted to this. In the present invention, the control portion may move the display position of the pointer also when switching from the third selection screen to a new screen. At this time, the display position of the pointer can be moved on the basis of the positional relation between the Z-coordinate of the reference position P0 and the Z-coordinate of the second correction position P2 which is the display position of the pointer displayed on the third selection screen. For example, the new display position of the pointer can be moved in the direction Z1 so as not to overlap a selection region on the new screen by the control portion when the second correction position P2 is on the side along arrow Z2 beyond the reference position P0.

While the display position of the pointer is moved to the vicinity of the outer edge of the selection region so as not to overlap the selection region by the control portion in each of the aforementioned first and second embodiments, the present invention is not restricted to this. In the present invention, the display position of the pointer may be moved to a region other than the region in the vicinity of the outer edge so far as the control portion moves the display position of the pointer to a position where the pointer does not overlap the selection region.

While the reset button is provided on the remote controller in the aforementioned second embodiment, the present invention is not restricted to this. In the present invention, the reset operation may be performed by an operation for moving the remote controller closer to or far from the liquid crystal television or an operation for quickly moving the remote controller vertically/horizontally. In other words, the reset button may not be provided on the remote controller so far as the remote controller is formed to allow the reset operation.

While the pointer storage region is arranged in the vicinity of the corner of the display screen portion in the aforementioned second embodiment, the present invention is not restricted to this. In the present invention, the pointer storage region may be provided not in the vicinity of the corner of the display screen portion but on a central portion of the display screen portion, for example, so far as the pointer storage region is arranged on the position not to be overlapped with any of the first, second and third selection regions.

While the first, second and third selection regions are automatically selected when holding the state where the pointer is overlapped for one second in each of the aforementioned first and second embodiments, the present invention is not restricted to this. In the present invention, the first, second and third selection regions may be automatically selected when holding the state where the pointer is overlapped for more than or less than one second.

What is claimed is:

1. An input apparatus comprising:
a display;
an operating portion for movably operating a pointer;
a display screen portion capable of displaying said pointer in a display position, a first screen having a first selection region selected when said display position of said pointer is overlapping said first selection region for a first period of time, and a second screen having a second selection region selected when said display position of said pointer is overlapping said second selection region for a second period of time, wherein said first screen is switched to said second screen when said first selection region is selected; and
a control portion performing control of moving, if said display position of said pointer overlaps said second selection region, said display position of said pointer in a first direction so that said pointer does not overlap said second selection region of said second screen, when said first screen is switched to said second screen,
wherein said first selection region is selected by a user holding said operating portion for said first period of time in the state that said display position of said pointer overlaps said first selection region,
wherein said control portion performs control of moving said display position of said pointer in said first direction by obtaining, in response to switching from said first screen to said second screen, a plurality of distances between said display position of said pointer and outer edges, located in a plurality of directions, of said second selection region and employing a direction of said plurality of directions where the distance of said plurality of distances is the smallest among obtained said plurality of distances as said first direction,
wherein said display screen portion is formed to be capable of displaying a third screen having a third selection region selected when said display position of said pointer is overlapping said third selection region for a third period of time, wherein said second screen is switched to said third screen when said second selection region is selected, and
wherein, in response to switching from said second screen to said third screen, said control portion performs control of moving, if said display position of said pointer overlaps said third selection region, said display position of said pointer in a second direction opposite to said first direction and moving said display position of said pointer so as not to overlap said third selection region of said third screen.

2. The input apparatus according to claim 1, wherein
said control portion performs control of moving said display position of said pointer in said second direction opposite to said first direction and moving said display position of said pointer so as not to overlap said third selection region of said third screen in a case where said display position of said pointer overlaps said third selection region when said second screen is switched to said third screen by selection of said second selection region, and control of not moving said display position of said pointer in a case where said display position of said pointer does not overlap said third selection region.

3. The input apparatus according to claim 1, further comprising a storage portion for storing a first position coordinate of said display position of said pointer before movement in said first direction by said control portion and a second position coordinate of said display position of said pointer after movement in said first direction by said control portion, wherein
said control portion performs control of moving said display position of said pointer in said second direction opposite to said first direction by obtaining said first direction from said first and second position coordinates stored in said storage portion when said second screen is switched to said third screen by selection of said second selection region.

4. The input apparatus according to claim 3, wherein
said control portion performs control of moving said display position of said pointer in said second direction opposite to said first direction by employing a direction where said second position coordinate is located with reference to said first position coordinate as said first direction when said second screen is switched to said third screen by selection of said second selection region.

5. The input apparatus according to claim 1, wherein
said control portion is formed to move said display position of said pointer to the vicinity of an outer edge of said second selection region on a side in said first direction and move said display position of said pointer to the vicinity of an outer edge of said third selection region on a side in said second direction.

6. The input apparatus according to claim 1, wherein
said display screen portion is formed to be capable of displaying a pointer storage region arranged on a position not to be overlapped with said first, second and third selection regions,
said operating portion is formed to allow a reset operation for moving said display position of said pointer to said pointer storage region, and
said control portion is formed to move said display position of said pointer to said pointer storage region on the basis of said reset operation.

7. The input apparatus according to claim 6, wherein
said pointer storage region is arranged in the vicinity of a corner of said display screen portion.

8. The input apparatus according to claim 6, wherein
said operating portion includes a reset button pressed by the user in said reset operation.

9. The input apparatus according to claim 6, wherein
said control portion stops control of moving said display position of the pointer so that said pointer does not overlap said first, second or third selection region and performs control of moving said display position of said pointer to said pointer storage region when said reset operation is performed.

10. The input apparatus according to claim 1, wherein
said control portion performs control of moving said display position of said pointer in said first direction different from a direction where a plurality of said second selection regions are adjacent to each other in a case where said plurality of second selection regions are displayed on switched said second screen to be adjacent to each other when said first selection region is selected and said first screen is switched by holding the state where said pointer is overlapped for said first time.

11. The input apparatus according to claim 10, wherein
said control portion performs control of moving said display position of said pointer in either one of upper and lower directions in a case where said plurality of second selection regions are displayed on said switched second screen to be adjacent horizontally.

12. The input apparatus according to claim 1, wherein
said operating portion includes a detection portion detecting vertical/horizontal movement of said operating portion by a user, and
said control portion performs control of displaying said pointer on said display screen portion to be vertically/horizontally movable in response to the vertical/horizontal movement of said operating portion detected by said detection portion.

13. An input system comprising:
an operating member for performing an input operation by radio communication; and
a display including a display screen portion movably displaying a pointer in a display position on the basis of the input operation by said operating member and a control portion,
wherein said display screen portion of said display is so formed to be capable of displaying a first screen having a first selection region selected when said display position of said pointer is overlapping said first selection region for a first period of time, and a second screen having a second selection region selected when said display position of said pointer is overlapping said second selection region for a second period of time, wherein said first screen is switched to said second screen when said first selection region is selected,
wherein said control portion of said display performs control of moving, if said display position of said pointer overlaps said second selection region, a display position of said pointer in a first direction so that said pointer does not overlap said second selection region of said second screen, when said first selection region of said first screen is selected to be switched to said second screen,
wherein said first selection region is selected by a user holding said operating portion for said first period of time in the state that said display position of said pointer overlaps said first selection region,
wherein said display control portion performs control of moving said display position of said pointer in said first direction by obtaining, in response to switching from said first screen to said second screen, a plurality of distances between said display position of said pointer and outer edges, located in a plurality of directions, of said second selection region and employing a direction of said plurality of directions where the distance of said plurality of distances is the smallest among obtained said plurality of distances as said first direction,
wherein said display screen portion of said display is formed to be capable of displaying a third screen having a third selection region selected when said display position of said pointer is overlapping said third selection region for a third period of time, wherein said second screen is switched to said third screen when said second selection region is selected, and
wherein, in response to switching from said second screen to said third screen, said control portion of said display performs control of moving, if said display position of said pointer overlaps said third selection region, said display position of said pointer in a second direction opposite to said first direction and moving said display position of said pointer so as not to overlap said third selection region of said third screen.

14. The input system according to claim 13, wherein
said control portion of said display performs control of moving said display position of said pointer in said second direction opposite to said first direction and moving said display position of said pointer so as not to overlap said third selection region of said third screen in a case where said display position of said pointer overlaps said third selection region when said second screen is switched to said third screen by selection of said second selection region, and control of not moving said display position of said pointer in a case where said display position of said pointer does not overlap said third selection region.

15. The input system according to claim 13, wherein
said display screen portion of said display is formed to be capable of displaying a pointer storage region arranged on a position not to be overlapped with said first, second and third selection regions,
said operating member is formed to allow a reset operation for moving said display position of said pointer to said pointer storage region, and
said control portion of said display is formed to move said display position of said pointer to said pointer storage region on the basis of said reset operation.

16. The input system according to claim 15, wherein
said operating member includes a reset button pressed by the user in said reset operation.

17. The input system according to claim 13, wherein
said operating member includes a detection portion detecting vertical/horizontal movement of said operating member by a user, and transmits a detection signal regarding detection of said detection portion, and
said control portion of said display performs control of displaying said pointer on said display screen portion to be vertically/horizontally movable in response to the vertical/horizontal movement of said operating member based on received said detection signal.

* * * * *